United States Patent [19]
Andresen et al.

[11] Patent Number: 5,384,662
[45] Date of Patent: Jan. 24, 1995

[54] PRECISION OPTICAL SLIT FOR HIGH HEAT LOAD OR ULTRA HIGH VACUUM

[75] Inventors: Nord C. Andresen, Hayward; Richard S. DiGennaro, Albany; Thomas L. Swain, Richmond, all of Calif.

[73] Assignee: The Regents of the University of California, Berkeley, Calif.

[21] Appl. No.: 90,585

[22] Filed: Jul. 12, 1993

[51] Int. Cl.6 .................................................. G01J 3/04
[52] U.S. Cl. ..................... 359/894; 359/227; 359/230; 359/231; 359/232; 359/233
[58] Field of Search ............... 359/227, 894, 230, 231, 359/232, 233

[56] References Cited

U.S. PATENT DOCUMENTS

| | | | |
|---|---|---|---|
| 2,705,440 | 4/1955 | George et al. | 359/232 |
| 4,017,162 | 4/1977 | Mills | 359/232 |

*Primary Examiner*—Eugene R. LaRoche
*Assistant Examiner*—F. Niranjan
*Attorney, Agent, or Firm*—Pepi Ross

[57] ABSTRACT

This invention relates generally to slits used in optics that must be precisely aligned and adjusted. The optical slits of the present invention are useful in x-ray optics, x-ray beam lines, optical systems in which the entrance slit is critical for high wavelength resolution. The invention is particularly useful in ultra high vacuum systems where lubricants are difficult to use and designs which avoid the movement of metal parts against one another are important, such as monochrometers for high wavelength resolution with ultra high vacuum systems. The invention further relates to optical systems in which temperature characteristics of the slit materials is important. The present invention yet additionally relates to precision slits wherein the opposing edges of the slit must be precisely moved relative to a center line between the edges with each edge retaining its parallel orientation with respect to the other edge and/or the center line.

23 Claims, 15 Drawing Sheets

PRECISION OPTICAL SLIT FOR HIGH HEAT LOAD OR ULTRA HIGH VACUUM

This invention was made with U.S. Government support under Contract No. DE-AC03-76SF00098 between the U.S. Department of Energy and the University of California for the operation of Lawrence Berkeley Laboratory. The U.S. Government may have certain rights in this invention.

BACKGROUND OF THE INVENTION

1. Field of the Invention

This invention relates generally to slits used in optics. It further relates to optical systems that use precision slits that must be precisely aligned and adjusted. The present invention even further relates to slits for x-ray optics and optical systems in which temperature of the slit materials is important. It still further relates to ultra high vacuum systems. The present invention yet additionally relates to precision slits wherein the opposing edges of the slit must be precisely moved relative to a center line between the edges with each edge retaining its parallel orientation with respect to the other edge and/or the center line.

2. Description of Related Art

Slits have been used in optical instruments for more than 50 years. The precision with which slit dimensions must be determined are a function of the wavelength of the light or electromagnetic radiation that passes through the slit. The shorter the wavelength, the more precise the slit opening must be. In the current state of the art, the slit width is controlled by driving a wedge into, or retracting the wedge out of, one end of the slit opening.

In ultra high vacuum devices it is very difficult to achieve fine motion because cleanliness requirements prevent use of lubricants such as oil. Thus fine and precise motion of metal parts, such as a wedge, against other metal parts, such as the slit edges, is problematic. An additional problem with using a wedge to adjust the slit width is that the edges of the slit lose their parallel alignment because the wedge is driven between the edges from only one side. Further, the distance of each edge from the center of the Opening must remain equal in order to maintain slit alignment. This in turn requires that the wedge is exactly symmetrically shaped and is inserted and moved with its axis of symmetry exactly parallel to the slit edges; this is very difficult if not impossible to achieve in an ultrahigh vacuum environment. When wavelengths approach those of x-rays additional problems arise. The metal edges of the slit absorb energy from incident x-rays causing them to heat. The dimensions then change due to thermal expansion. Further, temperature gradients distort the slit opening during operation of the instrument.

In view of the above limitations and problems in use of the existing optical slits, it would be desirable to have an optical slit that could be finely adjusted in an ultrahigh vacuum environment. It would also be desirable to have a slit that reliably and easily maintained parallel alignment of the edges when it was adjusted in an ultrahigh vacuum environment. Further it would be desirable to have an optical slit that did not significantly expand and distort due to thermal gradients caused by absorption of the radiant energy in the optical beam.

DESCRIPTION OF THE INVENTION

1. Summary of the Invention

The present invention provides an adjustable, thermally stable, optical slit for use in ultrahigh vacuum environments. An thermalized precision entrance slit design concept is capable of withstanding high heat loads from first focusing optics in high energy beam lines. The novel slit design and construction is highly precise and repeatable from a kinematics standpoint. Computer models showed that thermally induced distortions were limited to about 4 microns ($\mu$m). Performance improvements are obtainable by those of ordinary skill in the art by using interferometric measurement and control.

The optical slits of the present invention are useful in x-ray optics, x-ray beam lines, optical systems in which the entrance slit width is critical for high wavelength resolution. The invention is particularly useful in ultra high vacuum systems where lubricants are difficult to use and designs which avoid the movement of metal parts against one another are important, such as monochrometers for high wavelength resolution with ultra high vacuum systems.

The entrance slit was constructed by attaching two blades to a flexure assembly, machined from an approximately 2.0 inch GlidCop® plate using conventional wire electrical-discharge-machine (EDM) practices. The flexure was water cooled by two water channels 7 (FIG. 12) connected in series and had one actuator feedthrough to control slit width settings (FIG. 1). The blades (FIGS. 2 and 13) were made from approximately 5 mm thick GlidCop® and were mounted using six screws. The working edge of the blade had an approximately eight degree back rake. This allowed a laser diffraction pattern to traverse the blades without interference.

The blades were mounted so that a large percentage of their back surface area was in contact with the main body of the GlidCop® flexure assembly (FIG. 8), which was water cooled. GlidCop® has high thermal conductance and high mechanical strength. Its thermal conductance properties conducted heat away from the blades well enough to minimize distortion from temperature changes. GlidCop®'s high strength properties allowed the small connections between bars to flex or bend in a precise motion without failure by yielding or fatigue. Because the bars move relative to one another when these small connecting bridges flex, the bridges, or connectors, are termed flexural hinges or flexural pivots. Boring out a cylinder of specific radius and with a specifically positioned center, it was possible to narrow one spot along the pivot piece and thus control where the maximum amount of bending occurred (FIG. 6A). This was necessary so that the actuator motion was precisely transmitted to the slit section. Thus, the slit width was controlled precisely without contact bearing motion or moving metal parts against one another.

The initial design provided 20 mm wide knife edge blades and the flexural assembly allowed up to 30 mm maximum blade width for future applications.

A stainless steel flexural assembly was used in some circumstances with optional cooling channels for enhanced dimensional stability. Using stainless steel, stresses at the flexures limited the maximum slit width to 1000 $\mu$m. Thinner flexural pivots are used to increase the maximum slit width. For example, when GlidCop® was used for the body of the flexure assembly, flexure pivots on the thermal path were about 0.018 inches thick which optimized for stresses and heat conduction away from the slit. The flexural pivots that were not located on the thermal path were less thick because they did not have to serve as a heat path as well as a flexure point; they were about 0.012 inches thick to minimize mechanical stress.

Tension springs 1 were attached about the series of parallelograms attached to slit sections 22 and 24 to hold the slit width at the extreme end of its range when no actuator pressure was exerted. This allowed the greatest range of motion when the actuator was engaged.

For very high heat loads, a composite blade using diamond and silicon or diamond and molybdenum was used. The diamond quickly dissipates the heat over a surface. To reduce sensitivity to varying heat loads, the flexural assembly is made from silicon. A diamond film can then be deposited directly to the silicon flexure assembly and blades at the entrance slit may be omitted.

Finite element analyses (FEA) that used an accurate model of the aberrated power distribution showed that a GlidCop ® blade survived a missteered beam having peak power density of about 320 W/mm². Peak temperature at the blade edge was 150° C. and the maximum thermal stress was 20,000 pounds per square inch (psi).

For normal operation with varying heat loads from zero to about 20 Watts absorbed on each blade, the maximum change in slit width due to thermal distortion was about 4 μm. The thermal distortion was symmetric about the center of the slit opening, with change in parallelism at less than 30 μR (microradians).

The mounting configuration and counter-flow coolant channels provided an athermalized assembly to eliminate positional changes due to ambient and coolant temperature fluctuations. The maximum temperature rise in the flexural assembly was about 4° C. for normal operation. The thermal response time was approximately 1 minute to achieve a steady state dimensional stability.

Mechanical leverage of the flexural linkages provided about a 1:1 slit width adjustment ratio. A differential pitch micrometer was used for the actuator to achieve sub-micron resolution.

General Description Of The Invention

Detailed Description of the Flexure Assembly

Figure 9:
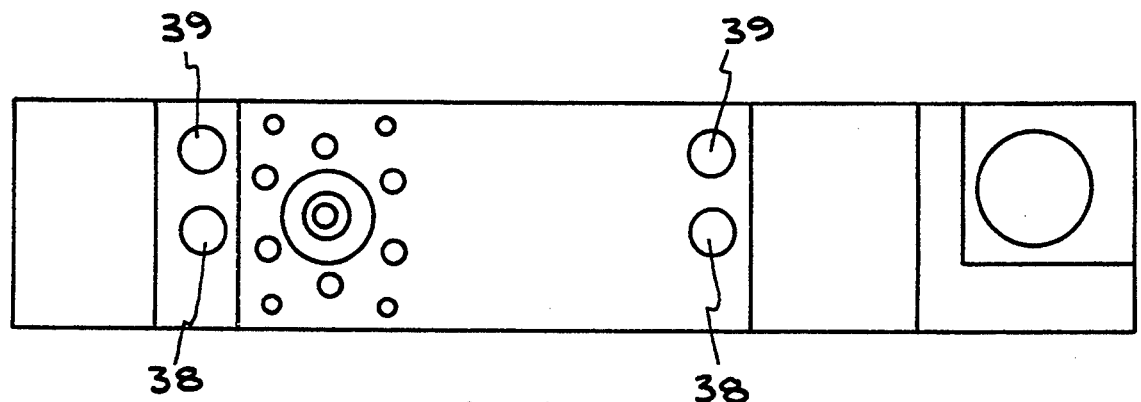
FIG. 9 is a machine drawing of the fabrication details for the water-cooled entrance slit, made of GlidCop ®.
Figure 9A:
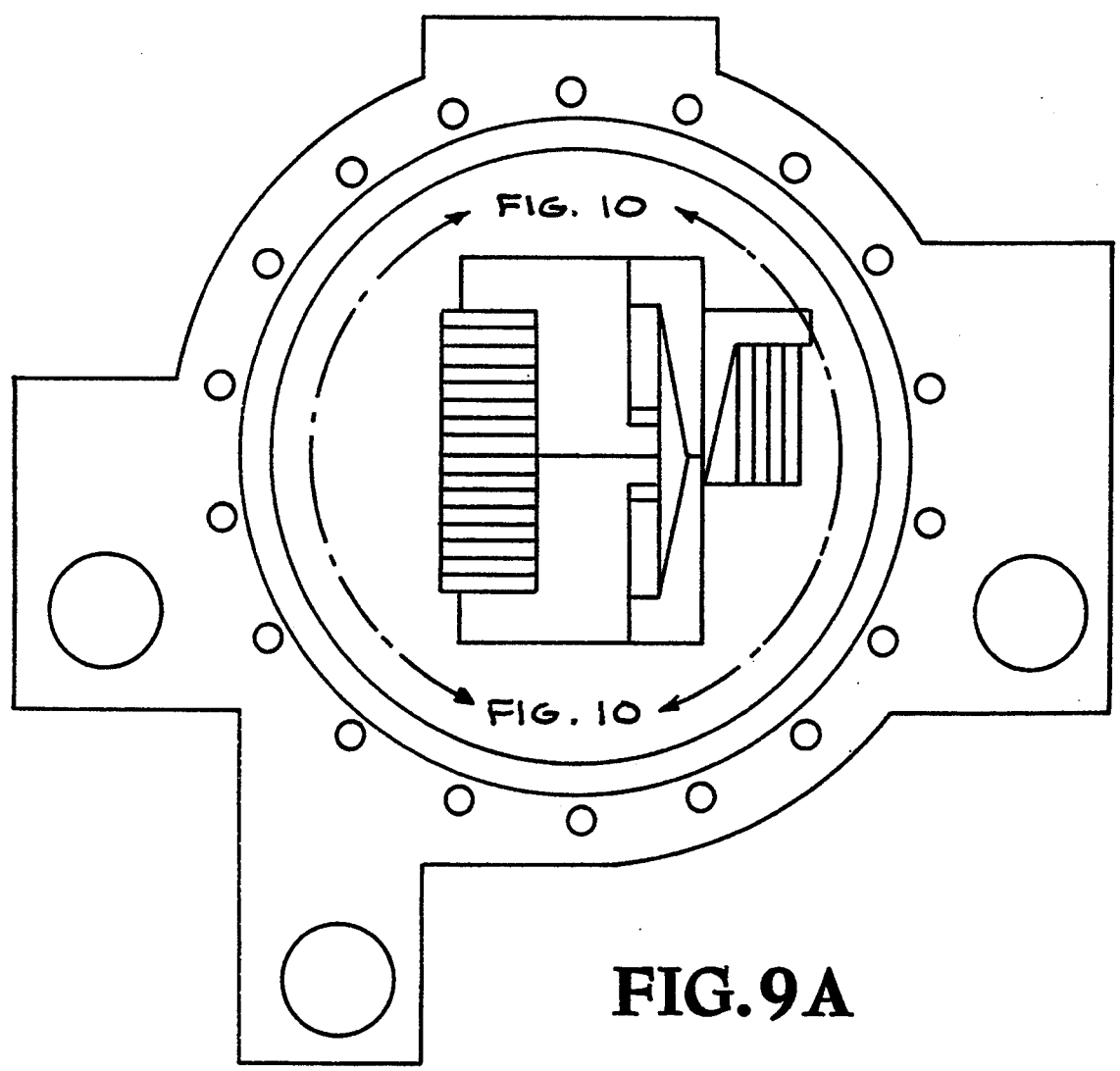
Figure 10:
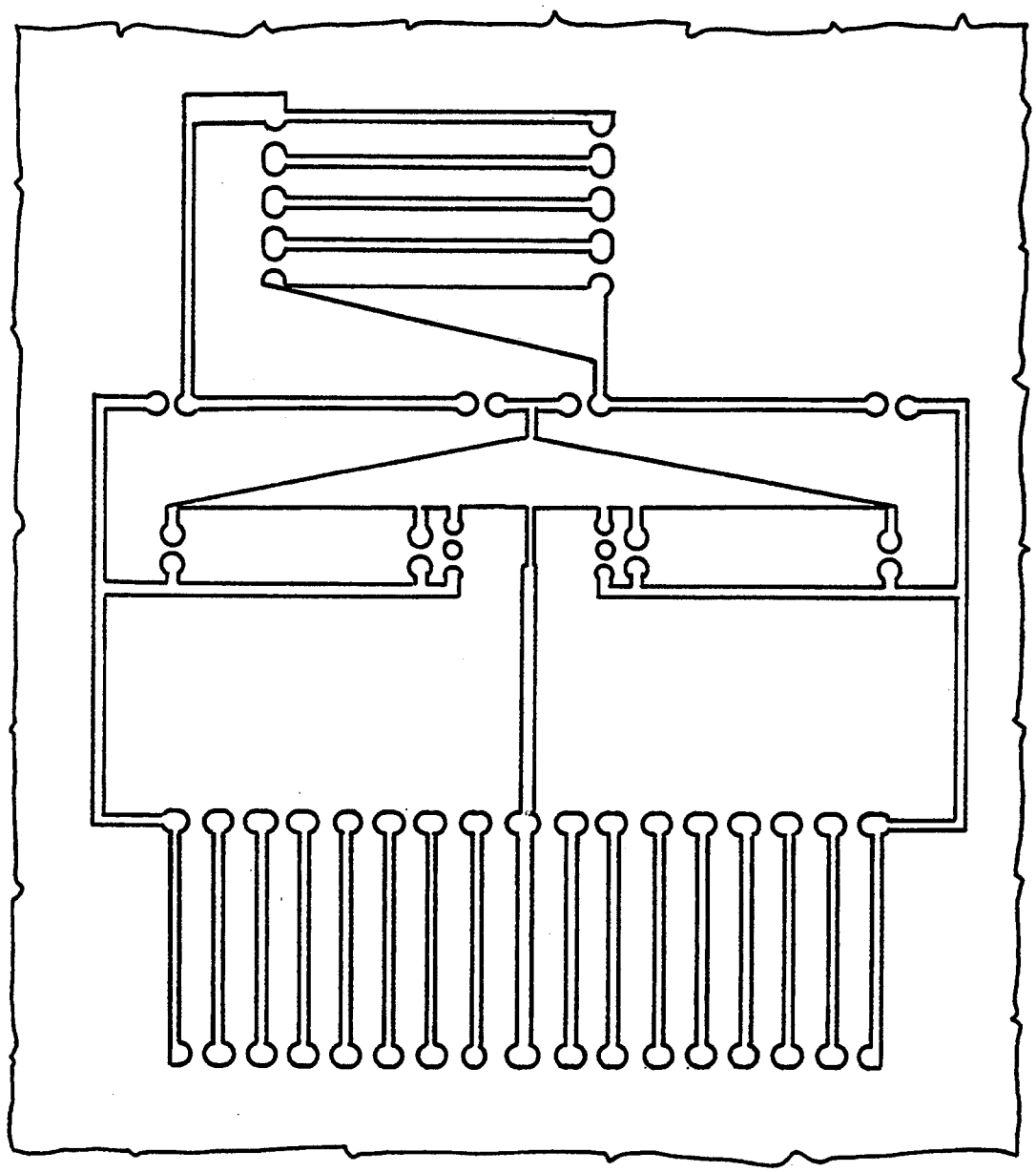
FIG. 10 is a detail of FIG. 9.

The flexure assembly invention has been reduced to practice primarily in three embodiments: a water-cooled device, constructed primarily from approximately 1⅜ inch thick GlidCop ®, for use in high energy radiation environments (machinist drawings, FIGS. 9 and 10); a non water-cooled device, made of approximately ½ inch thick stainless steel (machinist drawings, FIG. 11); and an aluminum device for low temperature applications where larger slit opening may be needed. In the first embodiment the flexure assembly comprised a block of high heat conductance, high strength material, such as GlidCop ®, into which sections or bars were cut. The sections were formed by making cuts into the body using electrical-discharge-machine (EDM) techniques. The sections thus made were connected to the main body or to each other through relatively thin connections. These connections were thin enough to bend or flex and so are called flexure pivots. Each section was able to rotate about its flexure pivot within the space made by the EDM cuts. The exact point at which the flexure pivots bent, or hinged, were located precisely by drilling cylinders of specified diameter into the body on either side of the flexural pivot, thus slightly reducing the width of the connecting flexural connection (FIG. 6A). The important parameters in selecting the material from which the optical slit flexure assembly was made were: elastic modulus, yield strength, fatigue strength and thermal conductance. Materials ranging in elastic modulus from about $10 \times 10^6$ psi (Al) to about $29 \times 10^6$ psi (stainless steel) were used. GlidCop ® (specification sheet incorporated herein by reference) had an intermediate elastic modulus of about $17 \times 10^6$ psi. Yield strength of the materials used were about 62,000 psi for a plate of 1 inch in thickness. Fatigue strength was 10,000 to 20,000 psi for Aluminum and about 35,000 psi for either stainless steel or GlidCop ®. Thermal conductance was about 365 Watts/(meter×degrees Kelvin ) at 20° C.; thermal conductance of stainless steel was about 1/30 that for GlidCop ®; and thermal conductance of aluminum was about ⅔ that for GlidCop ®. The material used for a particular application is a function of the application. For example, when a slit opening of only 400 μm to 500 μm was needed along with high thermal conductivity characteristics because of the nature of the radiation, GlidCop ® was used. When a slit opening of 1000 μm was needed, stainless steel was used. A person of ordinary skill in the art can evaluate the tradeoffs associated with the above parameters and choose the appropriate material for a given application.

Figure 6:
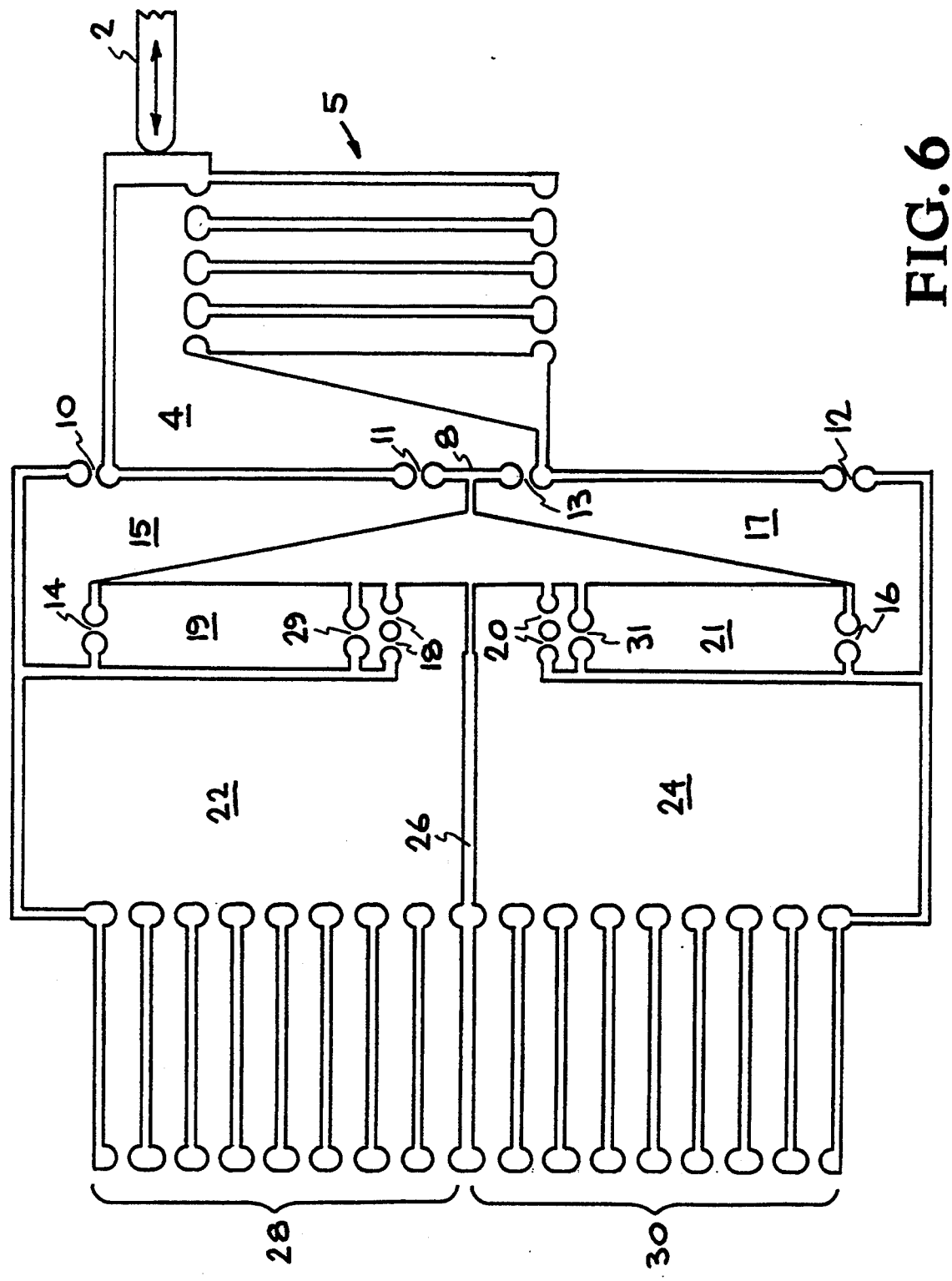
FIG. 6 shows a detail of the water-cooled entrance slit flexure.
Figure 6A:
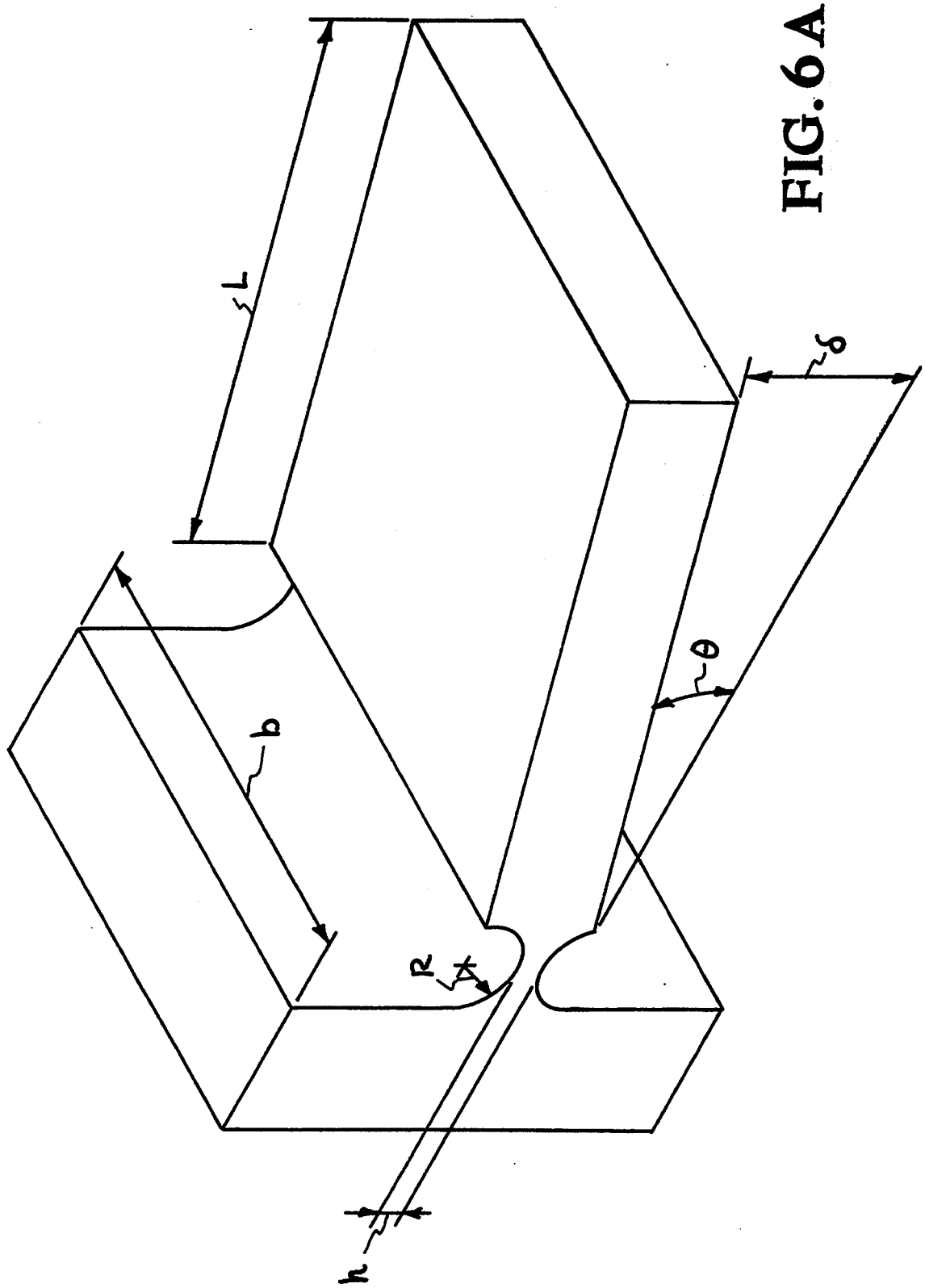
FIG. 6A shows a detail of the flexural pivot.
Figure 7:
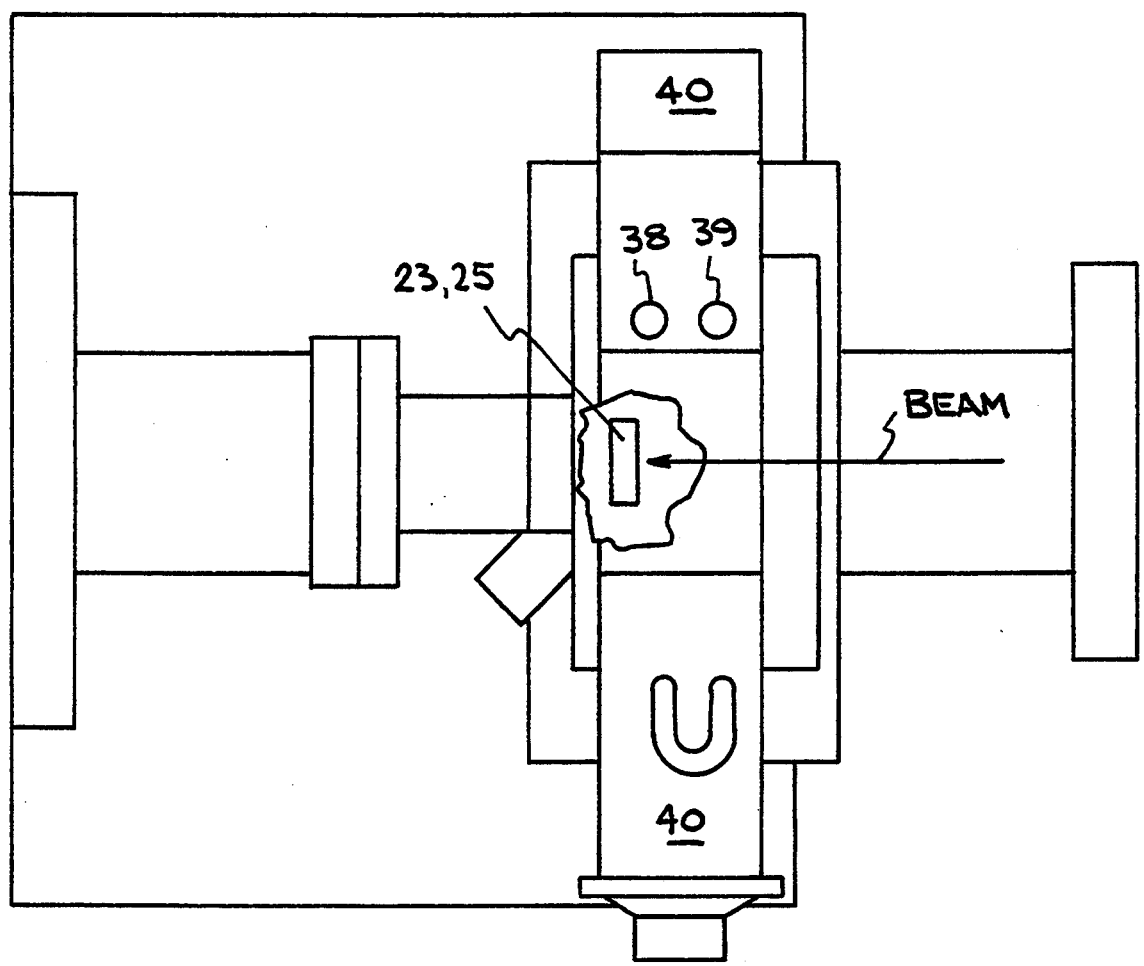
FIG. 7 shows the x-ray beam path relative to the water-cooled entrance slit flexure assembly and strut mounting.
Figure 8:
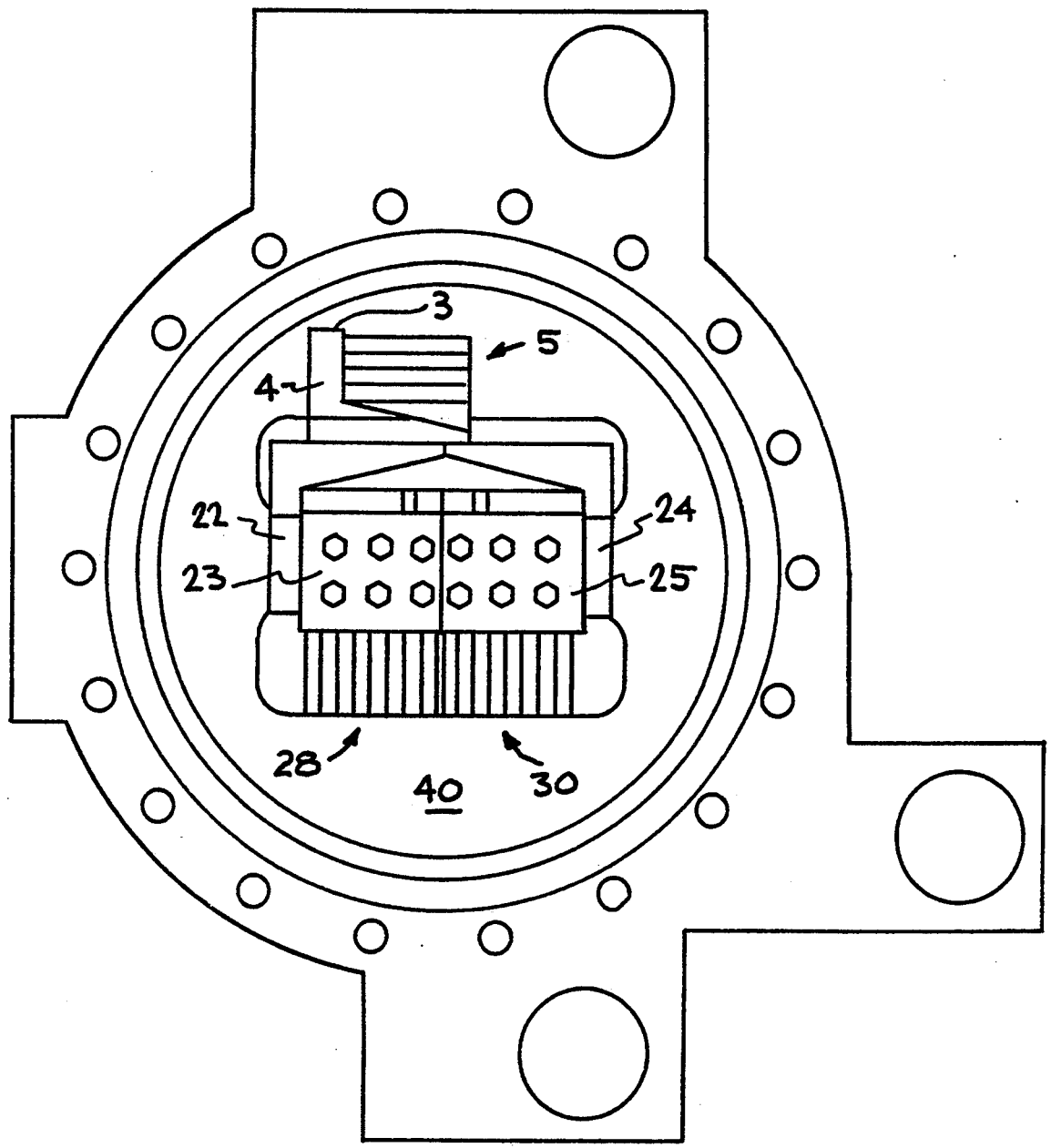
FIG. 8 is a view of the flexure assembly with the blades attached.

The novel water-cooled entrance slit flexure is illustrated in FIG. 6. This flexure assembly was novel in that it moved two blades apart while maintaining their edges in a parallel orientation to one another and at the same time maximizing the surface area of the blades that were in contact with the high-strength, high-thermal-conductance body, from which the flexure assembly was cut. The flexure assembly was comprised of a series of sections, or bars, and flexural pivots that connected the sections to one another and to the GlidCop ® body. The cuts, used to delineate the sections and flexural pivots were made using standard EDM techniques. The flexing was initiated by an actuator, such as a micrometer 2 that can move in either of two directions. Depending on the direction it moves, the actuator either exerted pressure on the flexure linkage section 4, opening the slit 26, or released pressure on the flexure linkage section 4, thus allowing the slit to close. The actuator motion was transmitted to the rest of the flexure assembly via an actuator linkage 3. The actuator linkage 3 pressed on a flexure linkage section 4 which is limited to move in horizontal motion by a series of parallelograms that form a structural flexure section 5.

The structural flexure section serves two functions: 1) it constrains the flexural linkage section (which links the actuator to the flexure assembly) to move in a linear rather rotational manner, and 2) it serves as a heat sink for heat that might be traveling from the slit sections 22 and 24 toward the actuator 2. The heat path, from the flexure linkage section 4 to the structural flexure section 5, is across the flexural pivots and since the width, h, is limited by the need to maintain flexural mechanical properties, it is necessary to increase the number of pivots in order to maximize the heat sink properties. Thus the structural flexure section 5 comprises two or more parallel rectangular bars or sections, each connected by at least one flexural pivot to the flexure linkage section 4 and by at least one flexural pivot to the main body 40 from which the entire flexural assembly was cut. In the case of the GlidCop ® body the structural flexure section 5 was comprised of four rectangular bars and the body was water-cooled by two water channels in which the water flowed in opposite directions. Further, in order to minimize slit size distortion due to thermal expansion of the flexure assembly, the structural flexure section 5 is oriented perpendicular to the axis of the actuator. If the structural flexure section had been aligned parallel with the actuator, thermal expansion might have caused the structural flexure section to press on and displace the rotation arm which in turn controls the slit width. Placing the structural flexure section perpendicular to the actuator avoids this problem. The effectiveness of the heat-sink properties is also, in part, a function of the thickness of the metal alloy body, b, from which the flexure assembly is cut.

The horizontal motion of the flexure linkage 4 was transmitted to the top rotation arm 15 and bottom rotation arm 17 through flexural pivots 11 and 13, respectively. This horizontal motion was translated into rotational motion of the top and bottom rotation arms 15 and 17. Top rotation arm 15 was limited to rotate about flexural pivot 10 while bottom rotation arm 17 was limited to rotate about flexural pivot 12. The rotational motion of rotation arms 15 and 17 was translated into vertical motion of the top athermal translation bar 19 and bottom athermal translation bar 21. When the top rotation bar 15 rotated about flexural pivot 10, flexural pivot 14 moved vertically which in turn required top athermal translation bar 19 to move vertically. The same mechanism applied to the bottom athermal translation bar 21 with the exception that 21 moved in an opposite direction from 19. Flexural pivots 29 and 31, allowed the athermal translation bars to rotate slightly without inducing rotational forces on slit sections 22 and 24. The top slit section 22 and the top athermal translation bar 19 had the same motion since they were directly coupled. Similarly, the bottom slit section 24 moved together with the bottom athermal translation bar 21. The top blade 23 and bottom blade 25 were mounted directly to the top and bottom slit sections 22 and 24, respectively and thus 23 had the same motion as 22 while 24 had the same motion as 25. The motion of the top and bottom slit sections 22 and 24 was further limited to vertical motion by a series of top thermal flexure parallelograms 28 and bottom thermal flexure parallelograms 30.

The top and bottom slit sections, 22 and 24, move apart when the actuator, or micrometer, is moved in. When the actuator is moved out, sections 22 and 24 move together. The series of thermal flexure parallelograms 28 and 30 guide the parallel motion. Only two parallelograms are needed to guide the motion; the others provide a heat sink for energy absorbed by the blades from incident energy of the beam or electromagnetic radiation. Linkages 18, and 20 were constructed as thermal resisters to limit heat transfer back to the actuator. Instead, the heat is conducted out to parallelograms 28 and 30.

It should be noted that while the orientations of the elements of the flexural assembly are noted in terms of "top" and "bottom", and "horizontal" and "vertical", these terms were used for ease of understanding and because the slit is used in a vertical orientation for many applications. However, it does not need to be used in a vertical orientation; it may be used in an orientation where its surface is parallel to the ground and the beam or optical radiation travels vertically. In this case rather than "top" and "bottom" sections the reader would think of 'first' and 'second' sections, and instead of "horizontal" and "vertical" directions, the reader would think of first and second directions.

Thermal and Tolerance Analysis of the Water-Cooled GlidCop ® Entrance Slit

Flexure

The flexure assembly was machined from a 2.0" thick GlidCop ® plate using conventional and wire EDM machine practices. The flexure was water cooled by two water channels connected in series and had an actuator feedthrough to accommodate the actuator. Acting through a linkage and the flexural assembly, the actuator controlled the slit width settings.

Blades

Figure 13A:
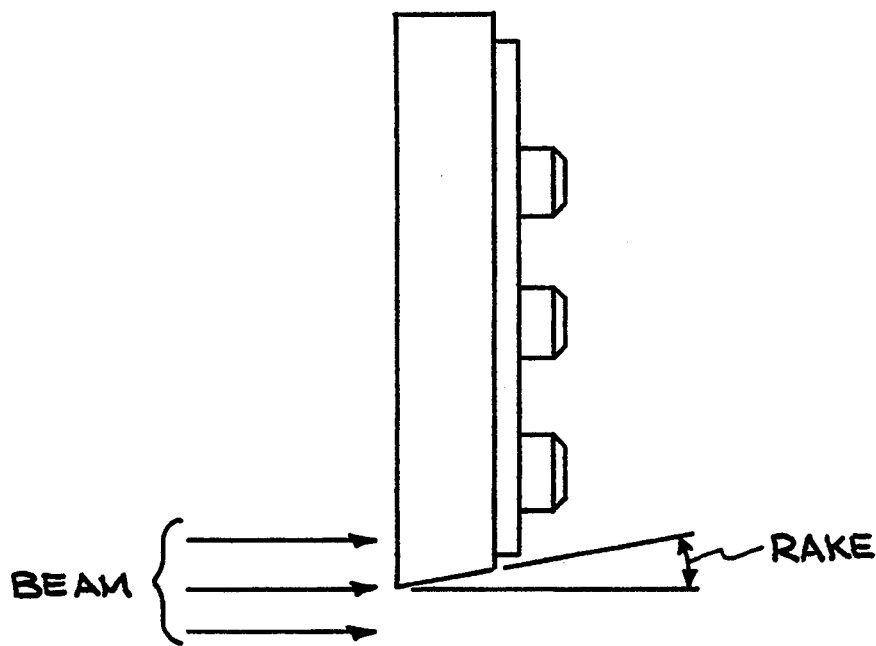
FIG. 13A shows a side view of the knife edge used to form the optical slit.
Figure 13B:
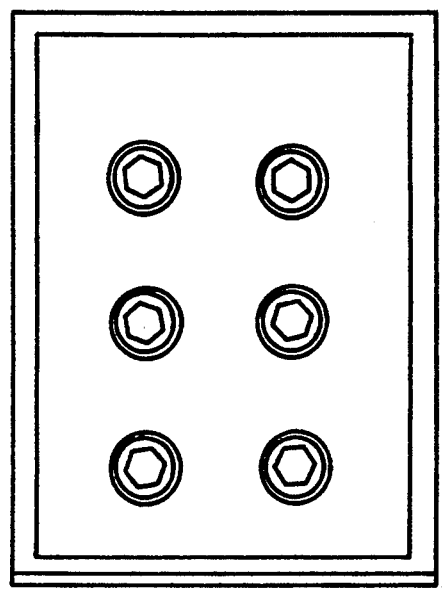
FIG. 13B shows a front view of the entrance slit blade design.
Figure 14:
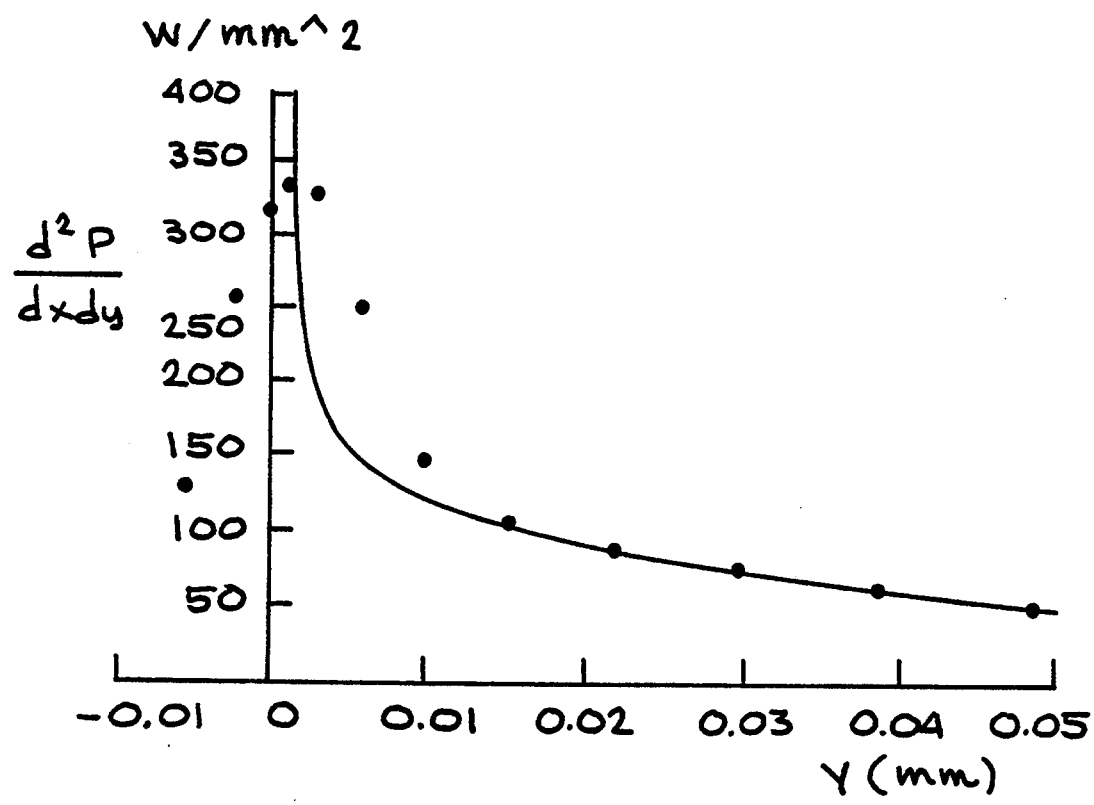
FIG. 14A shows the vertical distribution of power at the slit, viewed directly on an axis perpendicular to the surface of the slit.
FIG. 14B shows the power profile from an angle 25 degrees off the perpendicular axis. Because the beam in symmetrical about the center, the same power profile was measured from two different positions, each 25 degrees off the perpendicular axis.
Figure 14:
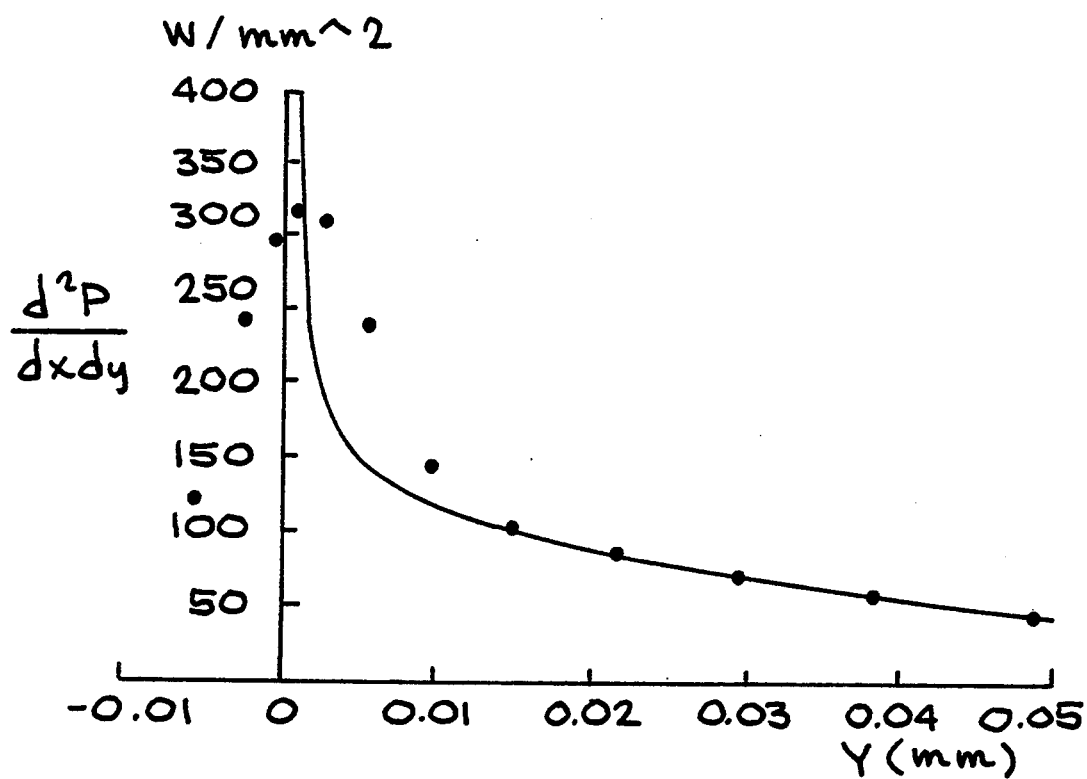
Figure 15:
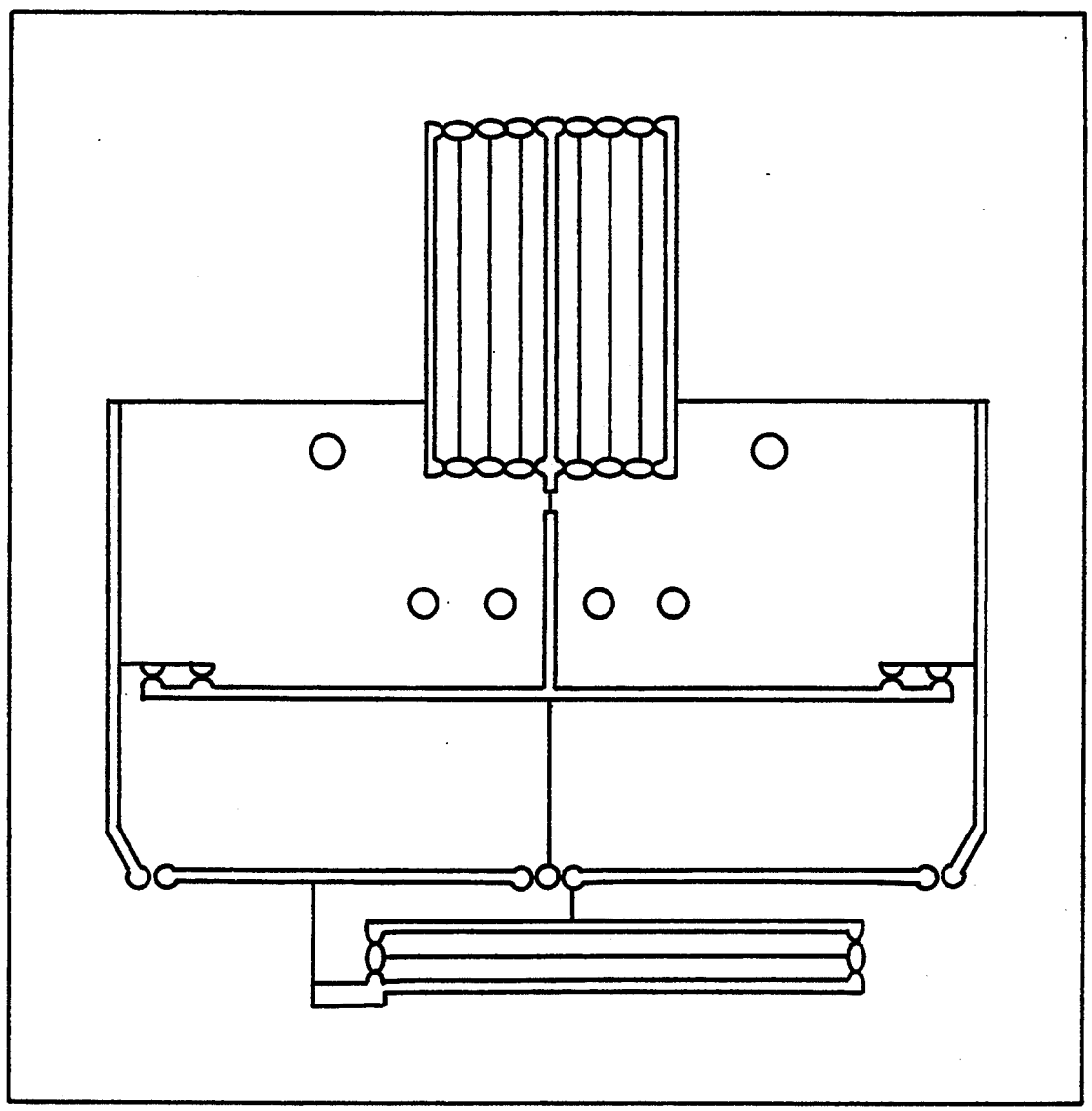
FIG. 15 shows a close up of the simplified flexural assembly configuration used in stainless steel construction.

The blades were made from 5 mm thick GlidCop ® and mounted using six 4–40 Unified National Coarse Socket Head Cap (UNC SHC) screws although many other types of screws could be used. The working edge, of the blade, had about an 8-degree backrake (FIG. 13A). This allowed a laser diffraction pattern to traverse the blades without interference.

Blade Adjustment

Adjustments to the location and orientation of the blades were made using two removable adjusting tools. The slit width and parallel alignment of the slit edges were measured using laser single slit diffraction patterns.

Slit Width Adjustments

Slit width settings were adjusted using a differential micrometer having a resolution of about 0.58 μm per division Divisions have about 0.026 inch (or about 0.66 mm) separation A ten sub-division vernier provided extra fine resolution. The micrometer feed-through was constructed with a bellows 6 to provide a vacuum barrier and allow motion.

Laser System

The slit width was monitored during adjustment and operation using a laser single slit diffraction pattern. The laser system comprised a 1 mW, Red HeNe (632.8 nm wavelength) laser, translation/rotation adapter, diagonal mirror, two viewports, and a view screen.

Support System

A six-strut support system 32, 33, 34, 35, 36, 37 was used. The flexure had two vertical struts made of Invar which supported the flexure on the centerline of the slit. Invar is a proprietary nickel and iron alloy with very low thermal expansion coefficient that is commonly available from many metal suppliers. The vertical adjusters had relatively coarse screw threads which required dial indicators to measure elevation adjustments. This system allowed a 20 mm range of adjustability in elevation and 200 mRadians range in roll. The resolution of the elevation and roll adjustments depended on the resolution of the dial indicators used.

The support design, in this case, had all constant length struts with spherical ball ends. The location of the ball joint could be moved for adjustments.

Survey and Alignment

At least three reference fiducials were placed on a surface external to the vacuum where they were accessible for surveying. The relative positions of the fiducial references and the knife edge positions were calibrated using a coordinate measuring machine. Using the fiducial references, the knife edges at the slit could be aligned under vacuum.

A support stand with four reference fiducials was built for alignment of the GlidCop® slit in the Advanced Light Source at Lawrence Berkeley Laboratory. At installation the slit was aligned to +1 mRadian for rotation about either of the two horizontal axes (roll and pitch) and +5 mRadian for rotation about the vertical axis (yaw). The roll of the slit was the critical parameter. Using a bubble-level sensitive to 10 seconds of arc or better, the roll was set to a precision of about 50 μRadians.

After installation it was necessary to survey and align the support stand and the slit assembly at periodic intervals depending on floor settlement rates, seismic activity, etc. The reference fiducials allowed either tooling balls or optical targets to be used, depending on survey and alignment methods employed.

Viewports and Viewing

The slit assembly had one viewport which exposed the upstream side of the flexure. A second viewport was accessed by removing the diagonal mirror from the laser system. This viewport reveals the upstream side of the blades.

Support Stand

The support stand was a 6×8×5 inch steel rectangular tubing, water filled post which was welded to its base plate and bolted to the assembly. To ensure good thermal stability the water in the post was held in contact with the base of the assembly and the post is in turn wrapped in a blanket of thermally insulating material.

Design Overview

The slit sections 22 and 24, translate vertically up and down by parallelogramming via 16 thermal flexures 28 and 30. These surfaces were actuated by translation bars 19 and 21. These bars were driven by top and bottom 2:1 rotation arms 15 and 17 which in turn were driven by an actuator linkage 3 acting through a flexure linkage section 4. The actuator linkage was constrained to translation due to 4 structural flexures 5. Thermal stability was provided by getting as much heat as possible to travel to the left of the entrance slit blade, while maintaining a minimum temperature rise in the flexures to the right. Both horizontal and vertical cooling channels 38 and 39, in the main body above and below the flexure were important in this regard. The vertical cooling channels convected heat away from the thermal flexures 28 and 30; the horizontal cooling channels thermally stabilized the main body 40.

FEA model of the Flexure Assembly

Slit designs can be analyzed and modified using a finite element analysis (FEA) model of the flexure assembly. The present invention was analyzed by entering the inventive slit and flexure design in a Computer Aided Design (CAD) software program, "ME10". The ME10 version was converted to an International Graphics Exchange Standard (IGES) format and then read into a commercially available software program from Swanson Analysis Systems, Inc. called ANSYS using AUX12, a read-in auxiliary to ANSYS. Options used within the ANSYS program were PREP7 for describing mechanical boundary conditions, two-dimensional (2D) STIF 82 elements, and the plane strain key option. Triangular as well as brick meshing was used. Areas were defined manually using the PICK function on an X-terminal workstation. The model comprised over 600 line segments.

Two load cases were run, one to look at the overall kinematics performance without heat loads, and one only with heat loads. The inversion matrix for this 22,000 node problem had a wave-front of about 500, and required about 18 minutes to solve the structural pass on an HP730 with 128 Mb of main memory. ANSYS plots of these and all subsequently discussed results are available in LBL publication #LBID 1950 and LBID 1960, incorporated herein by reference. Units in the model are inches, seconds, and 'snails' (mass). Since this 2D model assumed a unit thickness, resultant forces and imposed heat fluxes were scaled to correspond to an actual flexure thickness of 1.375".

Flexure Assembly Kinematics Performance

At the point of actuation, the about 1.375 inch thick flexure system was calculated to have an overall stiffness of about 7750 lbs/inch. To move the slit edges about 0.006 inches or 152 $\mu$m, the force required at the actuator, with no tension springs 1, was calculated to be 46 pounds. The displacement ratio of the slit to the actuator was about 0.890. Movement of the slit edges was approximately symmetric about the slit centerline along the long axis of the slit; the bottom closed 2% more than the top. For about 0.006 inches of slit edge displacement, the bottom knife edge was found to rotate about 58 $\mu$R (microradians) CW (clockwise) and the top knife edge about 52 $\mu$R CCW (counter clockwise) resulting in a net out-of-parallel motion of about 110 $\mu$R. These small deviations from idealized performance were the result of imparting strain energy to the flexure assembly. The blades were precisely aligned near the closed position where the parallel orientation is most important.

Spring loaded design

By attaching helical tension springs 1 from the top to the bottom entrance slit blade assembly surfaces, the blade was held in or biased to the closed position when no actuator force was exerted. This provided the greatest range of slit edge movement in response to actuator pressure. To achieve travel of about 150 $\mu$m with about 25% safety factor, two spring assemblies (front and back) with a minimum spring force of about 16 lbs. each were actually employed. So long as the compliance of the springs was less than about 1% of the overall compliance of the flexure (i.e., the compliance of the springs was about 77 lbs/inch whereas the compliance of the overall flexure was about 7750 lbs/inch), there were no problems with inducing additional rotations at the knife edge, even when the springs pulled out over the thermal flexures where they contributed a displacement dependent moment on the flexures.

Thermal Performance of the Flexure Assembly

Heat loads at the entrance slits in the Advanced Light Source at Lawrence Berkeley Laboratory reach up to 100 Watts (W) of power during normal operation of the undulator beamlines. Typically, 60W pass through the slit and the remaining 40W are absorbed at the knife edges. Heat transfer occurs by conduction from each knife edge to the flexure assembly. An approximated footprint for heat transfer to the flexure was computer modeled assuming 20W on the top and 20W on the bottom edge of the slit. The boundary conditions for cooling by convection to two parallel water channels 38, and 39, each 0.25 inches in diameter, were based on a 5 foot-per-second flow velocity. With a Reynolds Number of 9600, turbulent flow was assumed. Twenty Watts absorbed at each channel produces a bulk water temperature rise of 0.1° C. Using a 2-D model, the equivalent heat transfer film coefficient for this model at the convection boundary is about 6. W/(in$^2 \times$° C.). The analysis by computer modeling was performed using a thickness for the metal alloy body of one inch. Results were then scaled to account for actual thickness used.

Results of the thermal analysis showed a steady state temperature distribution in the model of the flexure assembly, showing a peak temperature rise of 4° C. above the supply water temperature, for one water channel. If the two parallel water channels 38, and 39, were run, the bulk temperature rise was halved.

Figure 1:
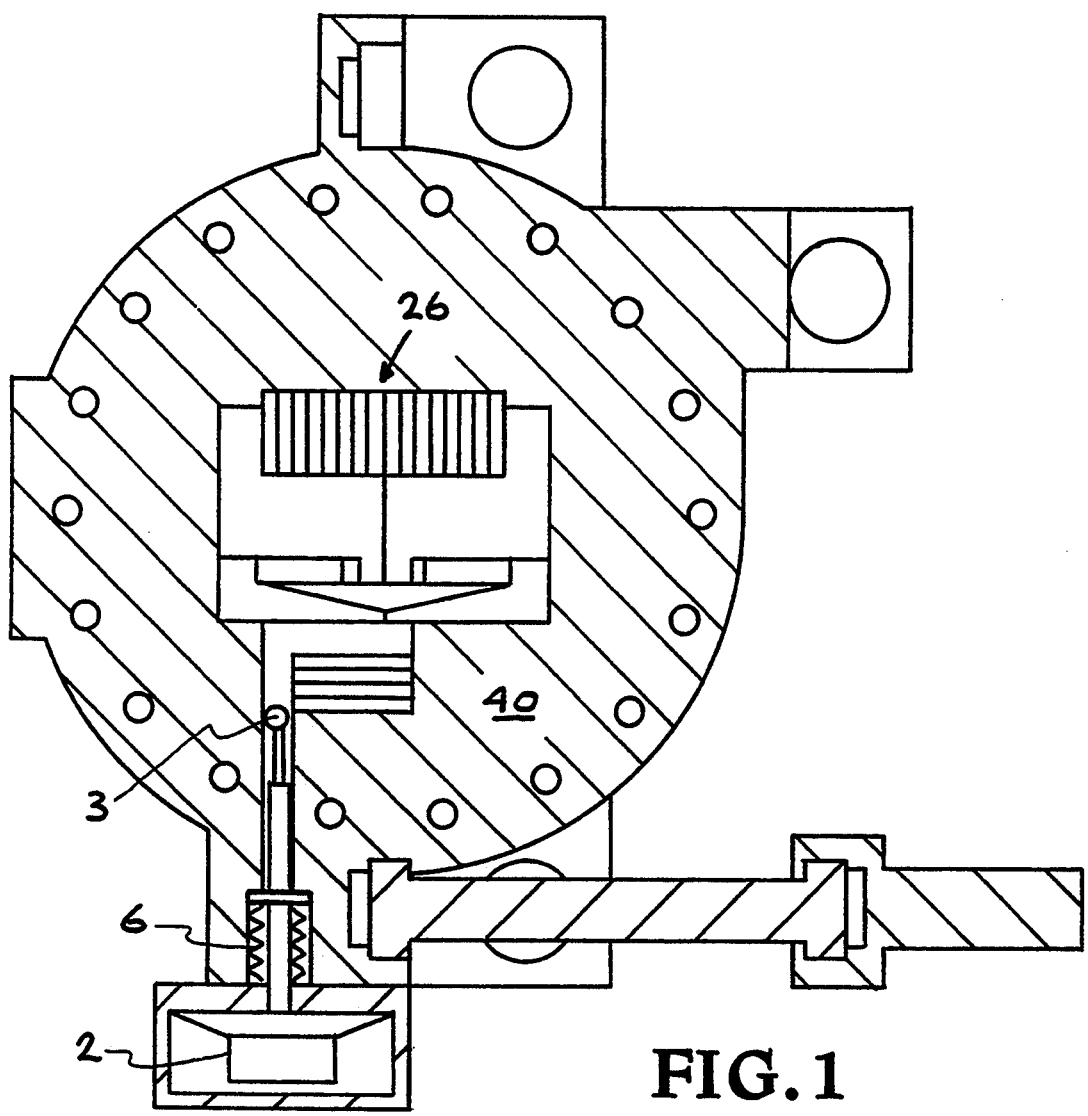
FIG. 1 illustrates the flexure cross-section with strut and actuator.
Figure 2:
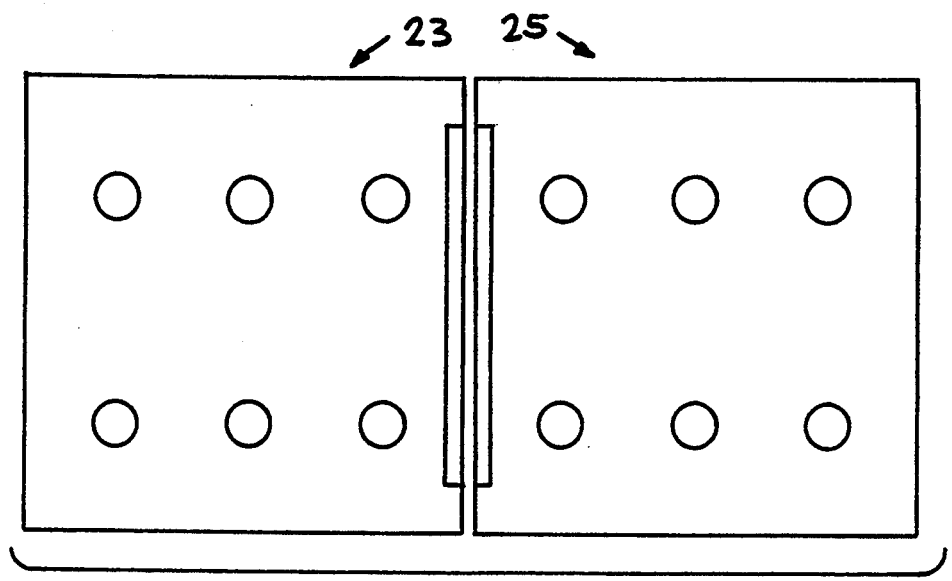
FIG. 2 illustrates the blade assembly which mounts onto the flexure assembly and provides the sharp blade edges that define the width of the slit.
Figure 3:
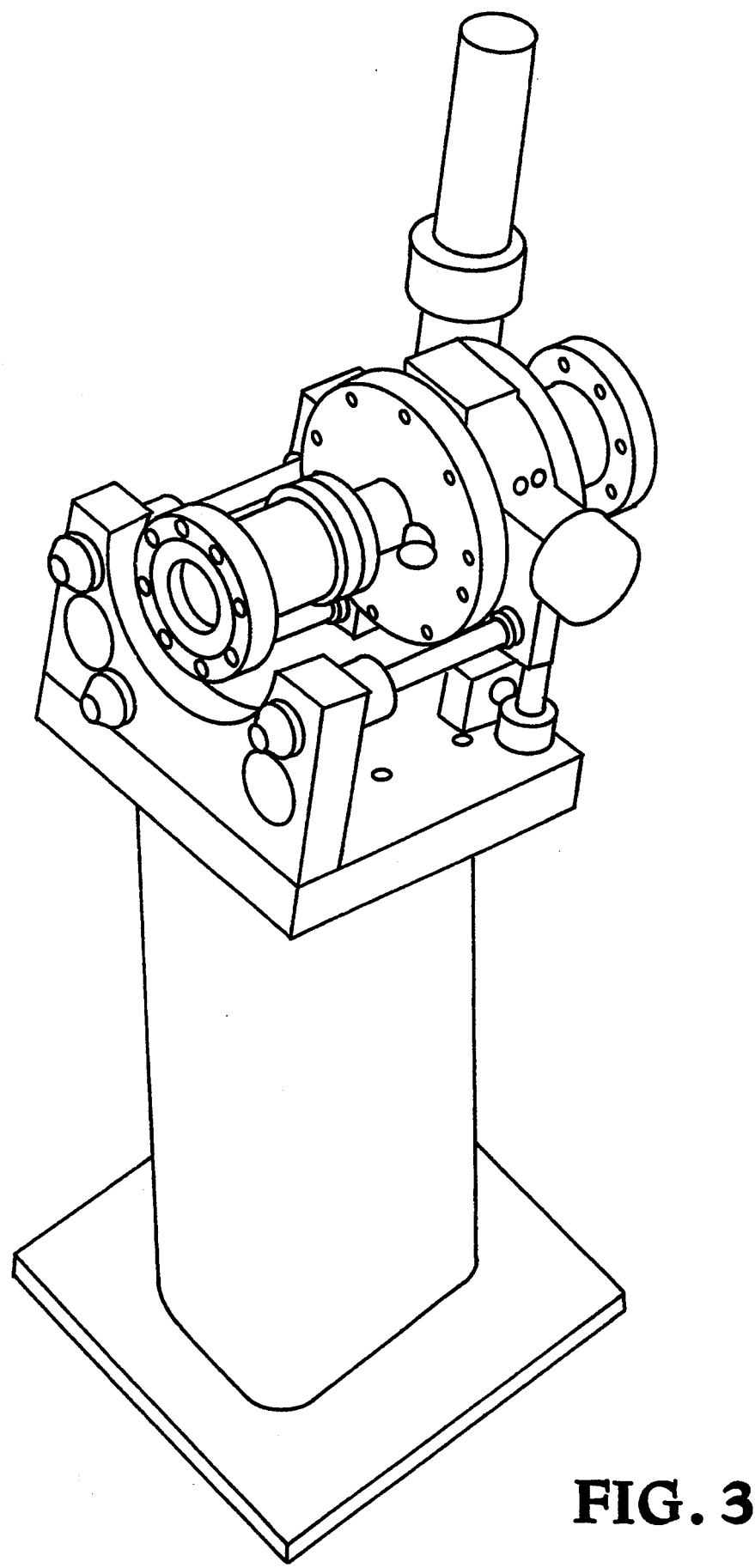
FIG. 3 is a diagram of the entrance slit assembly.
Figure 4:
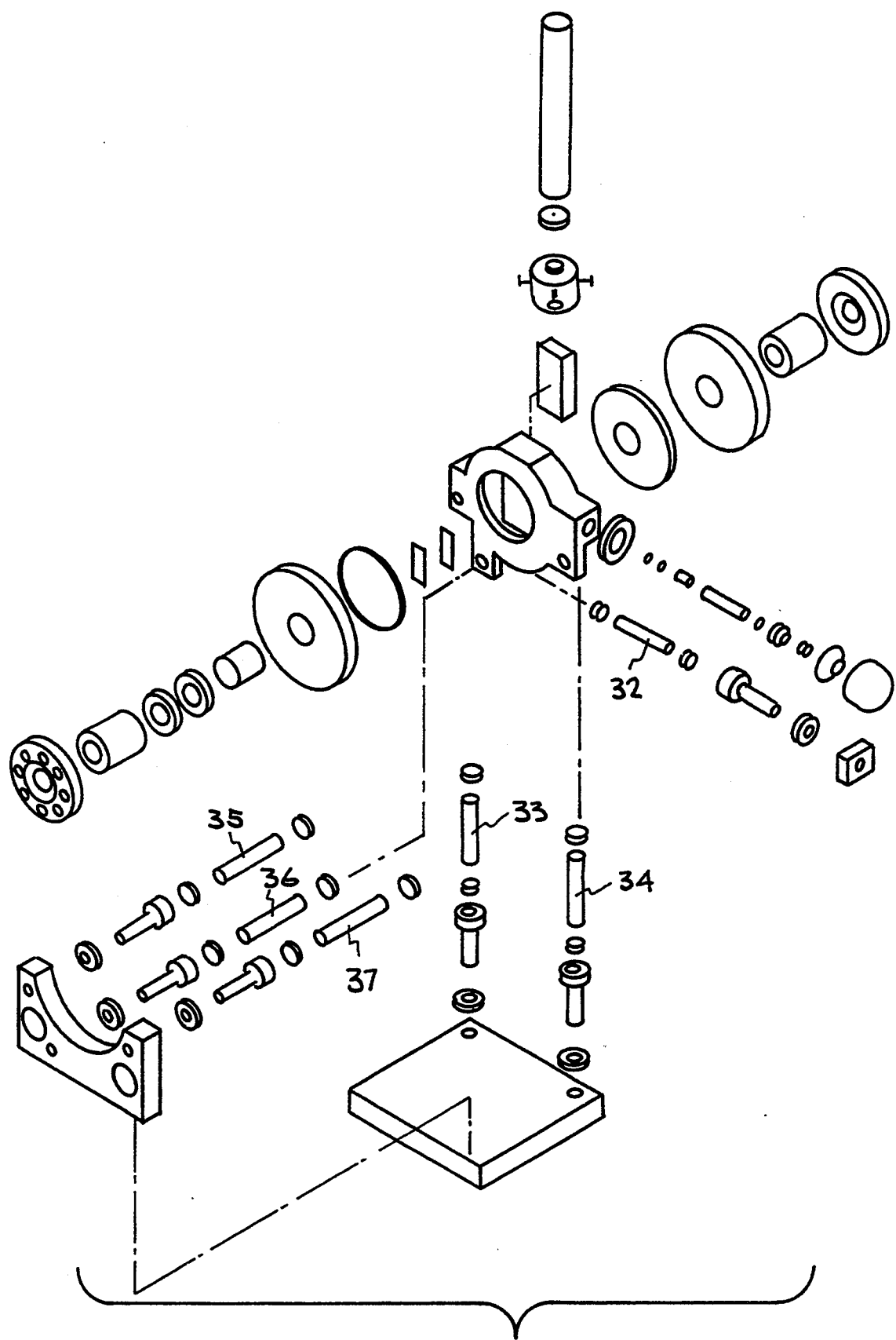
FIG. 4 is an exploded diagram of the entrance slit assembly.
Figure 5:
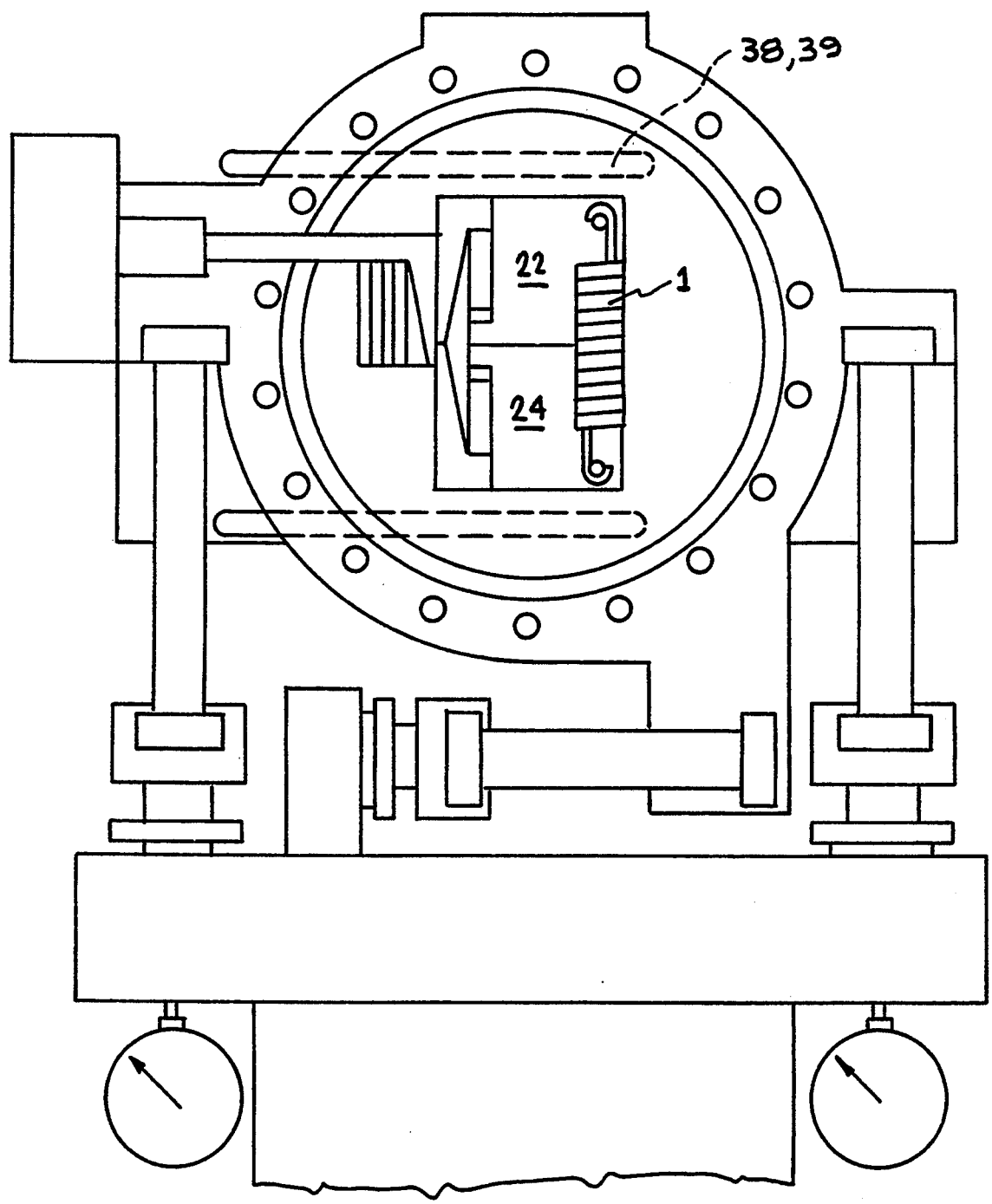
FIG. 5 shows one view of the water-cooled entrance slit flexure assembly and strut mounting.

The cooling configuration for the flexural assembly used a pair of channels machined into the main body 40. Two cooling channels were employed in order to use a counter-flow arrangement that minimized the effects of heating and also increased the effective cooling surface area. In one channel the supply water entered at the top of the main body, flowed along 3 sides and exited at the bottom (FIG. 5). The water was always slightly cooler in at the entrance to a channel than at the exit. Therefore the water flowed in the opposite direction in the second channel to enhance temperature uniformity. Also, the location of the cooling channels and the orientation of the of the flexural bars were deliberately chosen to enhance thermal performance. The horizontal thermal-flexure-parallelograms 28 and 30 were the main paths of heat conduction to dissipate heat from radiation absorbed at the knife edges. It was important to keep the knife edges cool to minimize dimensional changes due to thermal expansion. The predominant effect of any thermal expansion is in the long dimension. Therefore the orientation of the bars 28 and 30 was chosen so that any change in dimension due to thermal expansion had a minimal effect on the size of the slit opening. Using similar reasoning, because the actuator linkage was oriented horizontally and was driven horizontally to change the slit opening, any expansion that effected the horizontal dimensions of the actuator linkage had a direct impact on the size of the slit opening. Thus, orienting the rotation-arms 15 and 17 and structural-flexures 5, vertically produced no significant change in slit opening when these sections changed in length due to thermal expansion.

Full thermal analysis included a structural analysis which computed thermal distortion of the assembly based on the temperature distribution results. Additional boundary conditions were specified to represent the mechanical link to the slit adjustment actuator and fixed connections to a mounting or support stand. Design refinements of the flexure and cooling channel configurations and corresponding analytic iterations were performed to find compromises that reduced the change in slit width due to varying heat loads when operating conditions of the undulator source were changed for different x-ray wavelengths. Further design refinements might produce additional performance improvements. The current design gave acceptable performance for Lawrence Berkeley Laboratory's Advanced Light Source applications, where the maximum computed change in the slit width due to thermal expansion occurred when the total absorbed power changed from zero to 40 Watts. Computer modeling indicated that this power change closed the slit slightly asymmetrically: 1.2 $\mu$m change at the upper edge and 1.3 $\mu$m change at the lower edge for a total change of 2.5 $\mu$m. The asymmetrical distortion resulted from lack of symmetry of the linkage to the actuator. At the imposed structural boundary condition for the actuator connection, the distortion in the horizontal direction was reduced to less than 0.15 $\mu$m, which showed that there was no significant contribution to the slit width change due to horizontal distortions. The change in parallelism of the knife edges is also insignificant, with computed rotations of each knife edge being less than 15 $\mu$Radians.

Thermal Analysis of Entrance Slit Blade Assembly

Another factor that has a significant impact on the performance of the Entrance Slit system is the survivability and operational performance of the knife edges themselves, which are bolted to the flexure assembly. For use of the inventive slit in the high energy beam of Lawrence Berkeley Laboratory's Advanced Light Source, knife blade survival is an issue because if the beam is mis-steered or the slit is incorrectly positioned in the beam path, 100% of the incident beam power could be intercepted by a knife edge. Because the entrance slit was located at the focal point of a condensing mirror, although the total power is only 100 Watts, the power density could be extremely high (depending on the quality of the focusing mirror) and could melt or damage the knife edge. Thus, it was necessary to minimize temperatures in the knife edge by providing the best possible heat conduction and heat sink from the knife edge to the flexure assembly. The present invention used six screws to attach the knife edge to the flexure with high contact pressure and also provided generous contact area to achieve acceptable performance for the ALS applications. Other designs are possible and will be apparent to those skilled in the art that could enhance performance by increasing the heat transfer from the slit to the flexure.

Another performance issue for the knife edge is the change in slit width due to thermal expansion of the knife edges themselves (in addition to the change in slit width due to thermal expansion of the flexure assembly). A separate series of design iterations and finite element analyses were performed to achieve acceptable performance of the knife edges, which resulted in the current configuration which uses a simple block of GlidCop for the knife edge material, machined and polished to achieve a sharp edge. The interface between the flexure and the knife body was represented as a surface with a film coefficient representative of polished copper surfaces mated in vacuum with 250 psi of force. The top and bottom blades elongated 0.85 μm each, closing the entrance slit 1.7 μm in addition to flexure distortions. For higher heat loads or better performance, other knife edges could be attached to this flexure assembly, such as a diamond-silicon composite blade assembly which exploits the high thermal conductivity and low thermal expansion of diamond. Material selection is the key factor for performance enhancement and the most obvious trade-off is cost. An important aspect for the current design is that thermal distortion of the flexure assembly contributed only 60% of the change in slit width.

PERFORMANCE IMPROVEMENTS

Thermal isolation of the athermal translation bars is critical to performance of the optical slit under high power operation. Athermal translation bars 19 and 21 are further thermally isolated by use of additional thermal resistance linkages like linkages 18 and 20.

If performance enhancements are needed for other applications, either the blades, the flexure assembly or both could be made out of materials with lower coefficient of thermal expansion. Performance was improved by brazing a series of 1×1×5 mm, type II diamonds along the knife edge (and lapping the edges smooth after brazing). This reduces thermal distortion from about 1.7 μm to about 0.5 μm. Alternatively, a thin film of diamond deposited on a silicon substrate in the shape of the existing blade increases performance.

Alternately, it is possible to monitor the actual knife edge opening and provide automatic feedback controls for the actuator to adjust the slit opening to remain constant with varying heat loads. Finally, another option is to directly cool the knife edges with additional cooling channels that are integral with each knife edge. Although the above options provide improved performance, they also increase the cost.

Thermal Contact Between Blades And Flexure Assembly

A low thermal contact resistance and high shear strength is required at the bolted interface between the blades 23 and 25 and slit section surfaces 22 and 24. Low temperature brazing was ruled out due to the difficulties of re-achieving parallelism should the assembly become damaged.

In order to maximize heat transfer across copper surfaces in a vacuum, contact forces should be high, and surfaces must be smooth with highly compatible figure. To meet these requirements, mating copper surfaces were lapped to about 4 μ-inches or better, and assembled with six 4-40 stainless steel studs, gold plated with a minimum torque of 6 inch lbs. The gold plating acted as a thread lubricant to allow higher clamping force damping force and contact pressure was maintained during elevated temperature bakeouts because the thermal expansion coefficient (CTE) of stainless steel matched that of the GlidCop ®. This reduced the possibility of elongation and yielding of the screws or the GlidCop ® due to differential thermal expansion of the metals. With just over 1 square inch of contact surface this achieved contact pressures of approximately 1000 psi and corresponding heat transfer coefficients of 20 W/in$^2$-° C. across this boundary. This value translates to an equivalent path length in Copper of about 13 mm. A thin layer of gold on one of the mating surfaces reduces the possibility of cold welding of the clean copper surfaces and also aids in assembly.

Treating the blades and flexures as a system, a thermally induced closure of only 4.1 μ was achieved. Of that, 2.4 μm (or 60%) was attributable to the thermal expansion of the flexure assembly and 1.7 μm was attributable to thermal expansion of the blades.

Transient Behavior

Transient studies suggested the thermal response time of the flexure assembly was on the order of a minute. After initial illumination of the slit when the beamline shutter was opened, displacements due to thermal distortion stabilized within about 2 or 3 minutes. The mounting hardware was made with low-expansion materials, such as INVAR ®. The support stands were water filled and insulated to provide stability against variations in air temperature.

Low conductivity water circulated through the cooling channels 38 and 39 of the main body 40 of the flexure assembly. The low conductivity water was maintained at +0.1° C.

Individual Flexure Joints

Because a great deal of the stress of the system is concentrated in the flexural hinges, 10, 11, 12, 13, 18, 20, and those flexural pivots that connect the assembly to parallelograms 5, 28, and 30, detailed 2D Plane Strain FEA Studies were modeled on a single flexure (FIG.

6A) and compared with closed form analytical expressions. Flexure joints were created by making two cylindrical bores of specific radius, R, with the circumference of the bores separated by a distance h in the flexure assembly body (which could be made from any of several materials, including a GlidCop ® block, stainless steel, aluminum, or silicon). As illustrated in FIG. 6A, h is the smallest section of the flexure joint and is the point where the greatest amount of bending occurs under pressure. The material chosen for the body of the flexure assembly must have the right combination of strength and elasticity to survive the flexing without fatigue or yielding. A flexure assembly created in this manner is sometimes referred to as a radiused flexure assembly and its stiffness (in the elastic range) is given by the formula, $$\frac{\theta}{M} = \frac{9\pi R^{1/2}}{2Ebh^{5/2}}$$

where $\theta$ is the angle of rotation in radians, M is the moment, h is the thickness of the flexural pivot, b is the thickness of the GlidCop ® block, R is the relief radius, and E the elastic modulus. Closed form expressions for maximum stress were not available. FEA stiffness results agreed with the above equation within 20% (the equation above appears to understate stiffness). For the material used, values of R and h were chosen to keep stresses below yield, minimize stiffness, yet permit maximum heat conduction. We chose a flexural pivot thickness, h, of 18 mils, a bore radius, R, of 63 mils, and found that flexural pivot stress amplitudes remained under 12,000 psi (pounds per square inch) for deflections corresponding to an operating range of about 0–200 $\mu$m. Choosing a thicker flexural pivot made the entire flexure assembly excessively stiff, and provided only marginal improvements in heat conduction. The endurance limit for GlidCop ® AL-15 is 30,000 psi, which means that failure due to fatigue will occur after $10^8$ stress cycles based on statistical results of fatigue tests. For many engineering applications, design for "infinite life" is based on data for $10^8$ stress cycles. After considering the effects of finish, size, load factor, and temperature, an endurance limit $10^8$ stress cycles was obtained. For the other flexures used primarily to couple motions in which thermal conduction is less important, the flexural pivot thickness was 12 mils in order to minimize stress and allow for greater deflections. The use of GlidCop ®, a dispersion strengthened copper, instead of pure copper was desirable primarily for long term dimensional stability. It was chosen for its high yield and fatigue strength without sacrifice in thermal conductivity and flexibility parameters. Thermally induced flexural pivot stresses were found to be insignificant in comparison to their displacement induced counterparts.

Other materials from which the inventive precision optical slit are fabricated that demonstrate properties of high strength, high thermal conductance, and other parameter important to use in high energy beams are Amzirc ®, MZC ®, ElbrodurRS ®, and beryllium copper.

Stainless Steel Optical-Slit Flexure Assembly Without Water-Cooling

Figure 11A:
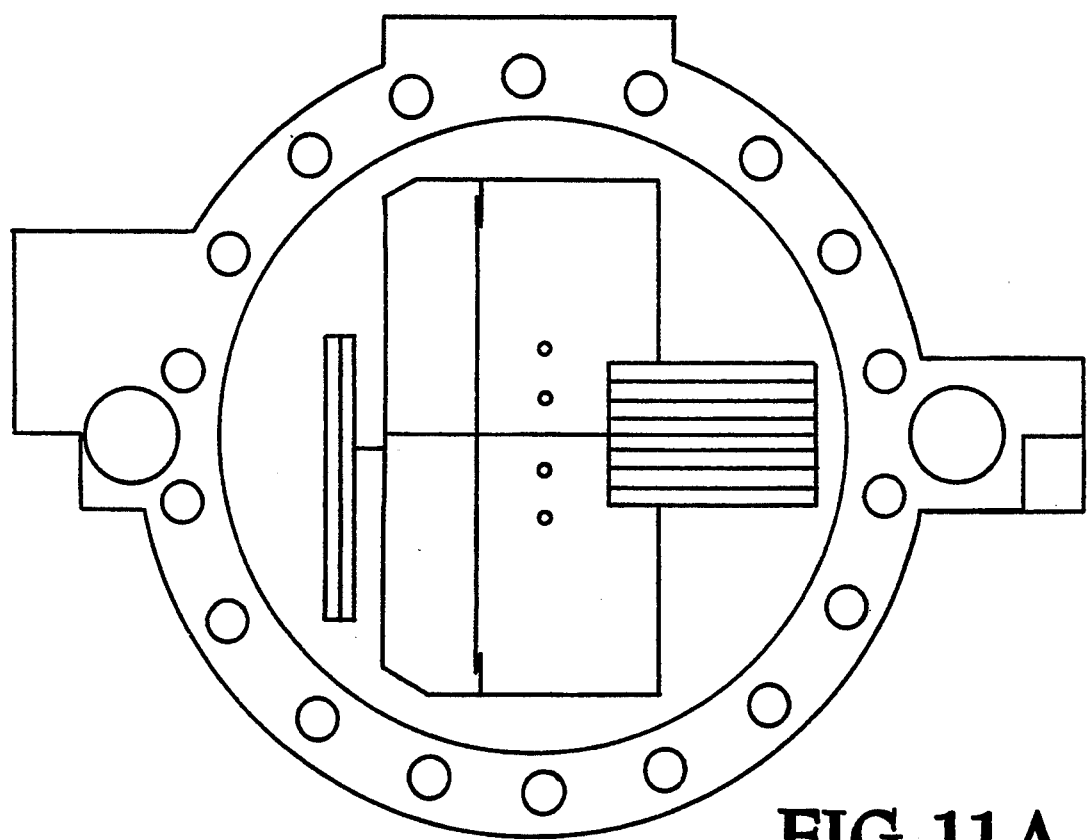
FIG. 11 shows the fabrication details for an-cooled exit slit made of stainless steel. It also shows an alternate set of dimensions and a simplification of the design of the flexure configuration.
Figure 11B:
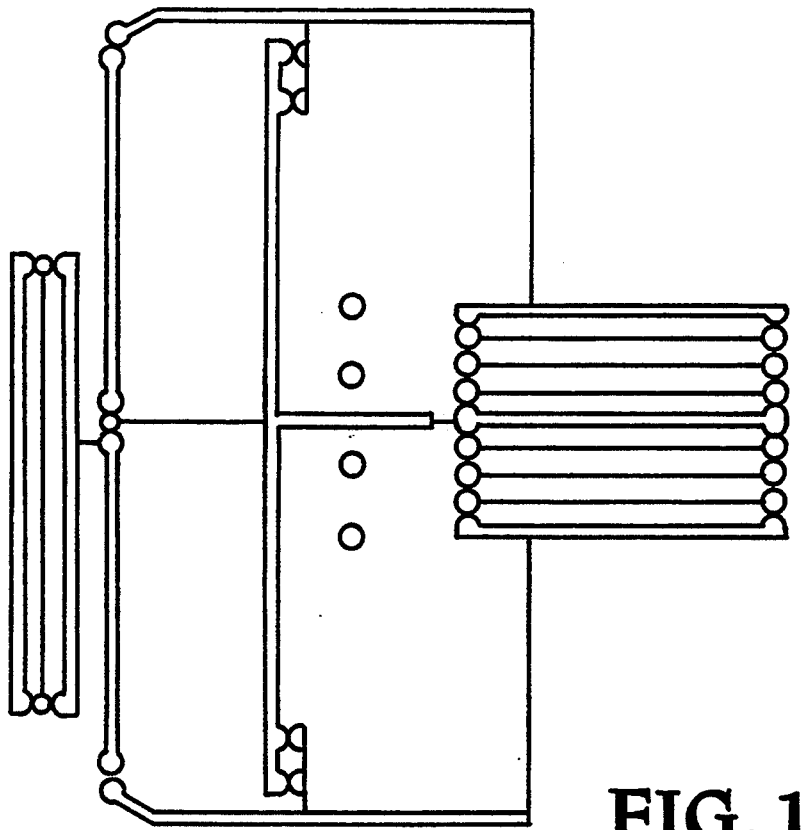
Figure 12A:
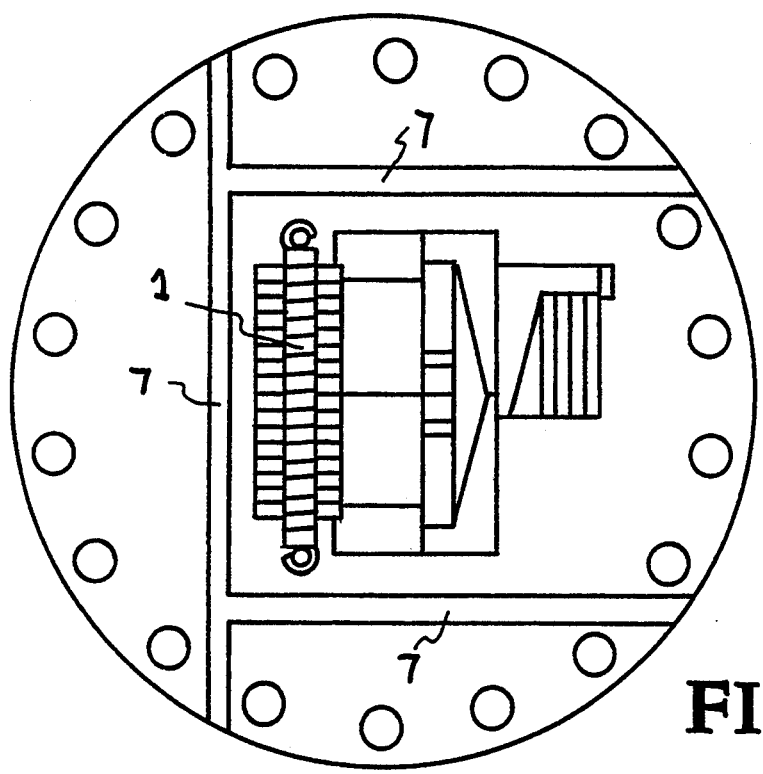
FIG. 12A is a view of the flexure assembly looking upstream.
Figure 12B:
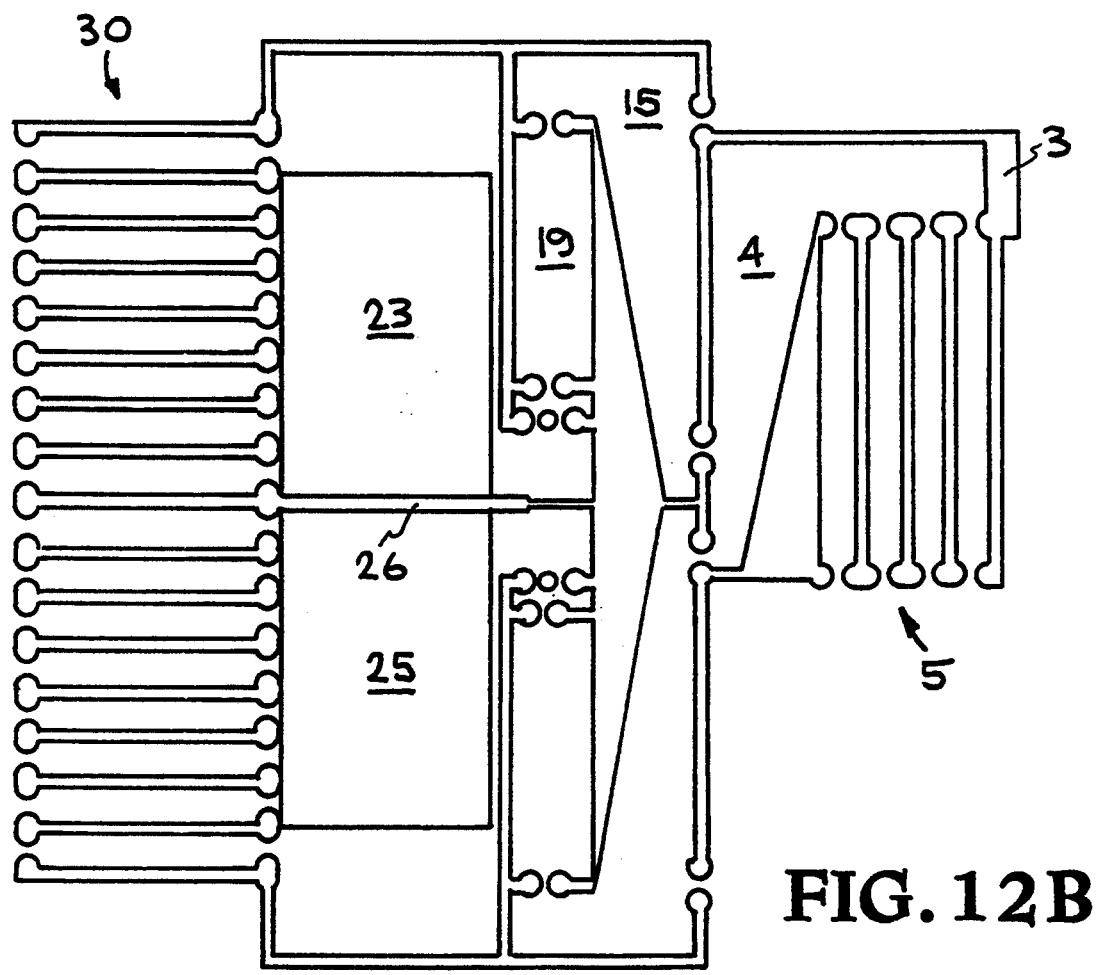
FIG. 12B is a detail of the flexure assembly.

Another embodiment of the present invention was an exit slit application for which energy absorption and heat loads were not problems. The same flexure design still provided a cost-effective mechanism to achieve similar precision adjustability for the ultra-high vacuum environment. Where heat loads were not an issue, there were several advantages to using stainless steel instead of GlidCop ® for the main body. Since the heat loads are small, heat conductivity is not a primary factor for material selection. Standard conflat-type flanges for the vacuum connection can be employed using stainless steel instead of other less common or less standard flanges required with GlidCop ®. Also, since heat conduction is not a major design requirement, fewer flexures are used and the overall depth of the main body is reduced from about 1.375" to about 0.5", which reduced machining fabrication costs. Additional simplifications of the flexure configuration were possible to simplify the overall assembly. One drawback by using stainless steel is the higher elastic modulus ($29 \times 10^6$ psi) which increases the stresses at the flexures for a given deflection. The maximum slit opening for this application is 800 $\mu$m which requires a larger deflection than for the Water-Cooled GlidCop ® Entrance Slit. This required that the thickness of the flexures, h, was reduced to 0.012" to provide more range of deflection with acceptable stresses. Without the requirement for heat conduction, there is no loss of function with the thinner flexures. Other changes that were implemented for the stainless steel application are external features for mounting the slit assembly in a different configuration in the absence of supply and return cooling lines. FIG. 11 provides the machine drawings for the stainless steel flexure; FIG. 17 illustrates the simplified stainless steel flexure configuration.

Many types of stainless steel can be used to fabricate the inventive flexure assembly and optical slit. The slits described above were made from 300 series stainless steel. One particularly useful assembly was made from 304 stainless steel.

Aluminum Optical-Slit Flexure Assembly

Aluminum flexure assemblies are constructed under circumstances where large slit openings are desired and heat loads are negligible. Use of aluminum alloys reduced fabrication costs because of the ease of machining aluminum, however thermal and dimensional stability is slightly less than it is with GlidCop due to aluminum's higher thermal expansion coefficient. The aluminum slit assembly was also chosen for precision slit application for non-vacuum environments, (that is laboratory optical tables and the like) or as a separate insert to be attached to a flange assembly. For common optical systems such as visible light monochromaters and spectrometers the flexure assembly is fabricated in a stand alone main body, rather than in a flange housing as was done with the GlidCop body. This keeps fabrication costs relatively low with no loss of precision. In these applications, or in any application where power absorption is not an issue, the inventive precision optical slit assembly can be used either as an entrance slit or as an exit slit.

Many types of aluminum alloy can be used to fabricate the inventive flexure assembly and optical slit. The slits described above were made from 7075 aluminum alloy, 6061 aluminum alloy, and 5052 aluminum alloy.

Silicon Optical-Slit Flexure Assembly

Silicon may be used in place of GlidCop ® in order to achieve improved dimensional stability with high heat loads. Silicon has relatively good thermal conductivity (κ) and low coefficient of thermal expansion (α) that give it high dimensional stability under high heat loads. Silicon is a very brittle material and must be machined like a ceramic. Typically, machining is done with an ultrasonic impact milling machine and also using grinding equipment. Some design changes are made to minimize the number of tapped holes in silicon and these changes will be obvious to one of ordinary skill in the art. Potential compromises using silicon are higher fabrication costs and limited choice of sealing methods for ultra-high vacuum. A change in the type of connection flange used for the ultra-high vacuum sealing would also need to be made.

In summary, the present invention provides an athermalized precision entrance slit design capable of withstanding high heat loads created by incident high energy x-rays such as those from first focusing optics on advanced light source synchrotron undulator beamlines. The inventive slit withstands stress and strain due to flexing and gives repeatable performance over long use, approximately 20 years. Thermally induced distortions are limited to about 4.1 μm.

The inventive optical slit design is useful for x-ray beam lines, synchrotron radiation, monochrometer applications where high wavelength resolution under ultra high vacuum environments is required, precision optical slit needs in the laser industry, or other applications requiring parallel motion about a center line such as detectors, x-ray beam position monitors, or mounting precision instrumentation.

Knife Edge FEA Code

```
/title,ALS Glidcop Entrance Slit V2.0
/com, TLS 8/28/92
/com, heat flux into half symmetry model now 40 watts
/com, better mesh to improve strain energy error norms
/com, option retained to look at 0.4 mm coatings
/com, units grams, mm, seconds, pascals, micronewtons, watts
kan,−1
et,1,70 *isopar thermal 8 node
!Material 1 is Diamond CVD, 2 is Silicon, 3 is Glidcop AL-15
mp,kxx,1,1.25
mp,kxx,2,.150
mp,kxx,3,.340
mp,ex,1,1.05e12 !Pa
mp,ex,2,1.23e11
mp,ex,3,1.07e11
mp,alpx,1,1.25e-6
mp,alpx,2,2.5e-6
mp,alpx,3,1.66e-5
mp,nuxy,1,.2
mp,nuxy,2,.3 ! this is a guess
mp,nuxy,3,.326
!Build the model
k,1,0,0
k,2,.4,0
k,3,5.4,0
kgen,2,1,3,1,0,.05,0
kgen,2,1,3,1,0,30,0
a,1,4,5,2
,4,7,8,5
,2,5,6,3
,5,8,9,6
/mdiv,1
/plof,1
lsse,,2,6,2
ldvs,all,,6
lsse,,8,11,3
ldvs,all,,8,29 ! originally 8, resulting in a discontinuous mesh
lsal
ldvs,10,,8,.0344 ! 1/29 from above
lsse,,1,3,2
lsas,,9
ldvs,all,,8
lsal
```

Knife Edge FEA Code -continued

```
ldvs,5,,27,1000
ldvs,7,,27,.001
ldvs,12,,27,.001
k,100,0,0,4
k,200,0,0,15
l,1,100,10 !113
l,100,200,8,7.7 !114 was originally 8
vdra,1,2,3,4,,,13,14
! original 0.4 mm diamond region
mat,3
vmes,1,2
vmes,5,6
! remainder of volume
vmes,3,4
vmes,7,8
!apply heat flux boundary conditions
!total power should be 40 watts
nsel,x,0$nrse,y,0$nrse,z,0,4 !no heat flux into these
nsel,x,0$nrse,y,.00625$nrse,z,0,4
hflo,all,heat,1.26
hflo,3,heat,.63
nsel,x,0$nrse,y,.0125$nrse,z,0,4
hflo,all,heat,.806
hflo,4,heat,.403
nsel,x,0$nrse,y,.01875$nrse,z,0,4
hflo,all,heat,.439
hflo,5,heat,.219
nsel,x,0$nrse,y,.025$nrse,z,0,4
hflo,all,heat,.348
hflo,6,heat,.174
nsel,x,0$nrse,y,.03125$nrse,z,0,4
hflo,all,heat,.297
hflo,7,heat,.148
nsel,x,0$nrse,y,.0375$nrse,z,0,4 !no heat flux into these
hflo,all,heat,.245
hflo,8,heat,.122
nsel,x,0$nrse,y,.04375$nrse,z,0,4 !no heat flux into these
hflo,all,heat,.206
hflo,9,heat,.103
nsel,x,0$nrse,y,.05$nrse,z,0,4 !no heat flux into these
hflo,all,heat,.193
hflo,2,heat,.097
nsel,x,0$nrse,y,0,.05$nrse,z,0,4 !look at the heated zone
nsel,x,0
nrse,y,1,30
cvsf,all,,,.0129 !corresponds to 250 PSI Vacuum surfaces
! coresponding to a nondimensionalized conduction length in Cu
! of 28 mm (k/h)
nall
numm,all
wsor,all
afwr
fini
!static analysis
kan,0
ktemp,1,1
symb,0,3,0
d,694,ux,0
d,716,ux,0
d,716,uy,0
nall
eall
afwr
fini
```

Example: Entrance Slit Thermal Load in U5 Beamline At Lawrence Berkeley Laboratory's Advanced Light Source The distribution of synchrotron radiation power on the entrance slit of the U5 undulator monochromator is calculated. This is the first piece of information needed for the design of the slits. As a worst case, the power distribution is computed for K=4 with 400 mA of electrons at 1.5 GeV. The U8 beamline employs higher K values, but there are two mirrors before the slit and the slit heating is less.

Richard Walker's undulator code 'urgent' is employed (in a modified form) to give the spectral and angular distribution of power from the undulator in a range of angles close to the axis, typical of the light admitted into the monochromator during beamline operation. $\theta$ is the horizontal angle, $\phi$ is the vertical angle and the angular distribution of undulator radiation is calculated at $\theta=0$ and 0.25 milliradians and at 21 values of $\phi$ from 0 to 0.217 milliradians for each of these 2 values of $\theta$.

The spectrum at each emission angle is multiplied by an energy dependent parameterization of the reflectivity of a gold mirror (at 2° grazing angle) and integrated to give the distribution of the reflected power at the surface of the condensing mirror. About 40 harmonics contribute power up to the energy (1800 eV) at which the reflectivity of the mirror becomes very small.

-continued
$r$ = source to mirror   $r^1$ = mirror to image
$R$ = mirror radius   $\alpha$ = incidence angle $$f(\alpha) = -1.5 \sin\alpha \left\{ \frac{r^1}{r}\left(\frac{\cos\alpha}{r} - \frac{1}{R}\right) - \left(\frac{\cos\alpha}{r^1} - \frac{1}{R}\right) \right\}$$

The corresponding power distribution is singular at the center of the slit and represents the aberrated imaging of a point source. The finite source size is included by convolving the calculated distribution of power with a normalized gaussian, representing the demagnified perfect image of the source (rms vertical source size=65 $\mu$m) at the slit.

The effects of mirror slope errors should be negligible.

TABLE 1

Contact Conductances

Source: C.L.Tien "A Correlation for thermal Contact Conductance of Nominally Flat Surfaces in Vacuum"
NBS Special Publication No. 302, 1968 pp 755-759
(Surface Roughness value picked to Fit Brobecks Data ME Design Data No. 24 at 30 PSI)

| | | | |
|---|---|---|---|
| Psi, Surf Rough 'Slope' | 5.40E-04 | 539.80 | $\mu$R |
| Contact Pressure | 30 | PSI | |
| Microhardness | 32000 | PSI | |
| RMS Surf. Rough (8) | 8.00E-06 | inches | |
| k | 10.1 | Watts/in-DegC | |
| h, effective HTC | 1.000 | W/in^2-DegC | |
| Eff. Length | 10.10 | inches | |

Contacting Cu surfaces, in Vacuum, optically flat
k of Cu

| Pressure, PSI | h, W/in^2-DegC | Eff. Length, inches |
|---|---|---|
| 30 | 1.000 | |
| 0 | 0.00 | |
| 100 | 2.78 | 3.630 |
| 200 | 5.02 | 2.014 |
| 300 | 7.08 | 1.427 |
| 400 | 9.04 | 1.117 |
| 500 | 10.93 | 0.924 |
| 600 | 12.76 | 0.791 |
| 700 | 14.55 | 0.694 |
| 800 | 16.30 | 0.620 |
| 900 | 18.01 | 0.561 |
| 1000 | 19.70 | 0.513 |

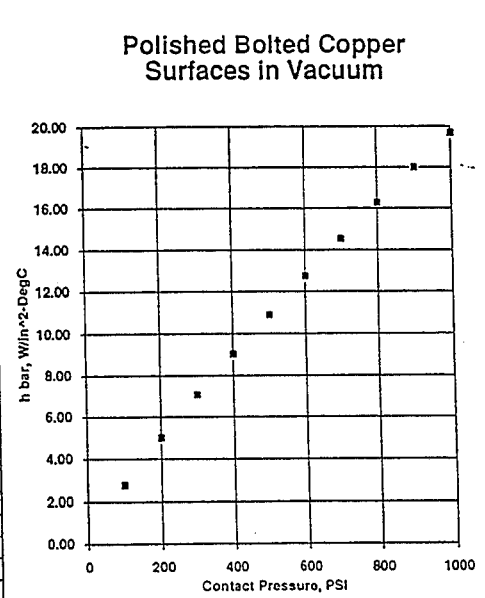

Polished Bolted Copper Surfaces in Vacuum

Blade Attachment Interface

| | | | | | |
|---|---|---|---|---|---|
| 4-40 Bolt preload at 75% | 250 | Lbs | | | |
| Number of Bolts | 6 | | | | |
| Effective Area | 1.07 | in^2 | | | |
| Average Pressure | 1395 | PSI | | | |
| RMS Pressure | 987 | PSI | | | |
| h | 19 | h, W/in^2-DegC | | 0.029450059 | W/mm^2-DegC |
| Power (Nominal) | 15 | Watts | Delta T Avg. | 0.73 | °C |
| Power (Survival) | 80 | Watts | Delta T Avg. | 3.92 | °C |

Each point on the mirror surface is mapped to the corresponding point in the image plane (the plane of the slit) taking into account the single most important geometrical aberration of a spherical mirror, which gives a ray displacement at the image quadratic in the length along the mirror.

$$\frac{d^2P}{dxdy} = \frac{d^2P}{dx_m dy_m} \frac{r}{r+r^1} \frac{1}{2y_m f(\alpha)}$$

$x,y \rightarrow$ image plane   $x_m, y_m \rightarrow$ mirror surface

The description of illustrative embodiments and best modes of the present invention is not intended to limit the scope of the invention. Various modifications, alternative constructions and equivalents may be employed without departing from the true spirit and scope of the appended claims.

We claim:

1. A high-precision, adjustable, optical slit comprising, a) a plurality of integrally related metal alloy sections and bars connected to one another by narrow metal alloy bridges that form flexural pivots at specified locations, said pivots forming a single arc when flexed said sections and pivots formed from a single metal alloy body and together forming a flexure assembly;

b) two of said metal alloy sections being opposed to each other with spaced apart parallel edges forming an optical slit therebetween which dimensions vary as the flexure assembly is flexed;

c) a feed-through extending between the exterior of the metal alloy body and the flexure assembly;

d) an actuator mounted in said feed-through;

e) an actuator linkage interposed between the actuator and the flexure assembly;

f) means for actuating said actuator whereby movement of the actuator against the actuator linkage results in flexure of the flexure assembly causing the opposed parallel edges forming the optical slit to move apart or closer together essentially without loosing their parallel orientation.

2. The optical slit of claim I additionally comprising,
a) a blade assembly comprising two opposed knife edge blades;
b) means for attaching said blades to said flexure assembly on the sections that form the optical slit with one blade on either side of the slit.

3. The optical slit of claim 1 additionally comprising, an adjustable bellows in the feed-through to act as a high-vacuum barrier.

4. The optical slit of claim 1 wherein the single metal alloy body is between 0.01 inches thick and 2.5 inches thick.

5. The optical slit of claim 4 wherein the single metal alloy body is between 0.10 inches thick and 1.5 inches thick.

6. The optical slit of claim 1 wherein the opposed parallel edges forming the optical slit to move apart or closer together without losing between 0.3% and 10% of their parallel orientation.

7. The optical slit of claim 6 wherein the opposed parallel edges forming the optical slit to move apart or closer together without losing between 0.3% and 2% of their parallel orientation.

8. The optical slit of claim 7 wherein the opposed parallel edges forming the optical slit to move apart or closer together without losing between 0.3% and 2% of their parallel orientation.

9. The optical slit of claim I wherein the metal alloy body is selected from the group comprising high strength copper alloys, GlidCop ®, Amzirc ®, MZC ®, ElbrodurRS ®, beryllium copper, stainless steel, aluminum alloy, and silicon.

10. The optical slit of claim 1 wherein the flexural pivots are between 0.005 inches and 0.030 inches.

11. The optical slit of claim 10 wherein the flexural pivots are between 0.010 inches and 0.020 inches.

12. The optical slit Of claim 1 wherein the body contains one or more channels for water cooling.

13. The optical slit of claim 12 wherein the body contains two channels for water cooling wherein the water may flow in opposite directions.

14. The optical slit of claim 1 wherein the flexure assembly comprises,
a) a flexure linkage section;
b) a structural flexure section comprising a plurality of parallel rectangular sections, each connected by flexural pivots to i) the flexure linkage section and ii) the main body of the flexural assembly, whereby the orientation and movement of the flexure linkage section is constrained to a path essentially parallel or orthogonal with respect to the slit edges and whereby heat is conducted away from said flexure linkage section;
c) a first rotation arm located adjacent to the flexure linkage section and connected to it by one or more flexural pivots;
d) a first athermalized translation bar located adjacent to the first rotation arm and connected to it by one or more flexural pivots;
e) a first slit section located adjacent to the first athermalized translation bar and connected to it by one or more flexural pivots;
f) a first thermal flexure parallelogram section comprising a plurality of parallel rectangular bars, each having two or more flexural pivots connecting each bar of the first thermal flexure parallelogram section to i) the first slit section and ii) the metal body, whereby heat is conducted away from said first slit section and whereby the orientation and movement of the first slit section is constrained to a path essentially parallel to or orthogonal to the slit edges.

15. The optical slit of claim 14 wherein the structural flexure section comprises between two and eight parallel rectangular bars.

16. The structural flexure section of claim 15 wherein the parallel rectangular bars are oriented perpendicularly to the axes of the actuator and entrance slit.

17. The flexural assembly of claim 14 wherein the first thermal flexure parallelogram section comprises between four and ten parallel rectangular bars.

18. The optical slit of claim 14 wherein the flexure assembly additionally comprises,
a) a second rotation arm located adjacent to the flexure linkage section and connected to it by one or more flexural pivots;
b) a second athermalized translation bar located adjacent to the second rotation arm and connected to it by one or more flexural pivots;
c) a second slit section located adjacent to the second athermalized translation bar and connected to it by one or more flexural pivots;
d) a second thermal flexure parallelogram section comprising a plurality of parallel rectangular bars with two or more flexural pivots connecting each bar of the second thermal flexure parallelogram section to i) the second slit section and ii) the metal body, whereby heat is conducted away from said second slit section and whereby the orientation and movement of the second slit section is constrained to a path essentially parallel or orthogonal with respect to the slit edges;
each of the above four elements positioned in mirror image of the first rotation arm, first athermalized translation bar, first slit section, and the first thermal flexure parallelogram section and connecting flexural pivots.

19. The flexural assembly of claim 18 wherein the second thermal flexure parallelogram section comprises between four and ten parallel rectangular bars.

20. The optical slit of claim 1 wherein the actuator is a micrometer.

21. The optical slit of claim I wherein the actuator linkage is a stainless steel ball.

22. Use of the optical slit of claim 1 as a precision optical entrance slit for with high energy x-ray beams from synchrotron sources.

23. Use of the optical slit of claim 1 as a precision optical entrance or exit slit for visible-light or ultraviolet spectrometers.

* * * * *